United States Patent [19]
Kobayashi

[11] Patent Number: 5,463,742
[45] Date of Patent: Oct. 31, 1995

[54] PERSONAL PROCESSOR MODULE AND DOCKING STATION FOR USE THEREWITH

[75] Inventor: Shigeo Kobayashi, San Jose, Calif.

[73] Assignee: Hitachi Computer Products (America), Inc., Santa Clara, Calif.

[21] Appl. No.: 27,188

[22] Filed: Mar. 5, 1993

[51] Int. Cl.⁶ .............................. H05K 7/10; G06F 13/00
[52] U.S. Cl. ......................... 395/281; 361/688; 361/679
[58] Field of Search ................................... 395/325, 275; 364/508; 361/393, 688, 679

[56] References Cited

U.S. PATENT DOCUMENTS

| | | | |
|---|---|---|---|
| 4,530,066 | 7/1985 | Ohwaki et al. | 364/708 |
| 4,715,385 | 12/1987 | Cudahy et al. | 128/710 |
| 4,788,658 | 11/1988 | Hanebuth | 364/900 |
| 4,890,832 | 1/1990 | Komaki | 273/1 |
| 4,941,841 | 7/1990 | Darden et al. | 439/377 |
| 5,030,128 | 7/1991 | Herron et al. | 439/372 |
| 5,041,924 | 8/1991 | Blackborow et al. | 360/69 |
| 5,097,388 | 3/1992 | Buist et al. | 361/393 |
| 5,133,076 | 7/1992 | Hawkins et al. | 395/800 |
| 5,155,662 | 10/1992 | I-Shou . | |
| 5,161,169 | 11/1992 | Galano et al. | 375/8 |
| 5,187,645 | 2/1993 | Spalding et al. | 361/393 |
| 5,265,238 | 11/1993 | Canova, Jr. et al. | 395/325 |
| 5,291,419 | 3/1994 | Satoh et al. | 364/508 |
| 5,307,465 | 4/1994 | Iki | 395/325 |
| 5,313,596 | 5/1994 | Swindler et al. | 395/325 |
| 5,323,291 | 6/1994 | Boyle et al. | 361/683 |
| 5,371,858 | 12/1994 | Miller et al. | 395/275 |

OTHER PUBLICATIONS

S. Miastkowski, "A Whale of a System," *BYTE*, Aug. 1991, pp. 39–40.
S. Miastkowski, "The Granite–Sided Brick from Ergo Computing: Transportable Technology," *BYTE*, Jun. 1990, pp. 117–118.
"Customer–Installable Attachment Module," *IBM Technical Disclosure Bulletin*, vol. 33, No. 4, Sep. 1990, pp. 38–39.
W. F. Dibble et al., "Base Pluggable Design," *IBM Technical Disclosure Bulletin*, vol. 24, No. 1A, Jun. 1981, p. 28.

Primary Examiner—Jack B. Harvey
Assistant Examiner—David A. Wiley
Attorney, Agent, or Firm—Flehr, Hohbach, Test, Albritton & Herbert

[57] ABSTRACT

A highly portable personal processor module (PPM) for use in a variety of docking stations, each of which can be connected to the personal processor via a standard connector, the personal processor and docking station when so connected defining a complete computer system, the personal processor containing a microprocessor, magnetic storage and memory, and the docking station providing at least a power supply, a cooling system for the PPM, a keyboard and a display. The personal processor is loaded with a user's personalized operating system and software so that the user can carry their preferred computing environment with them. The personal processor module also includes control software that reads and recognizes a type code provided by each docking station and configures the PPM accordingly. For the situation when the PPM cannot identify the docking station to which it is connected, the PPM provides a default configuration routine. The PPM also tracks the number of connections made to docking stations so as to determine the remaining life of the PPM's connector. The docking station includes a power coupling controller that locks the PPM into the docking station and will not allow power to be withdrawn from the PPM other than in response to a positive user command, thus preventing inadvertent data loss from the PPM's memory.

19 Claims, 24 Drawing Sheets

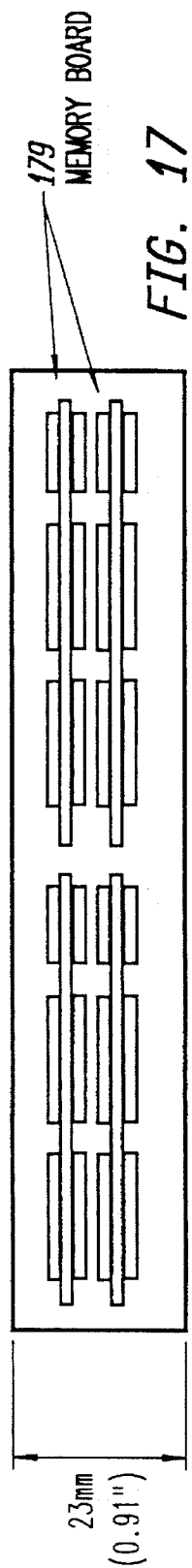
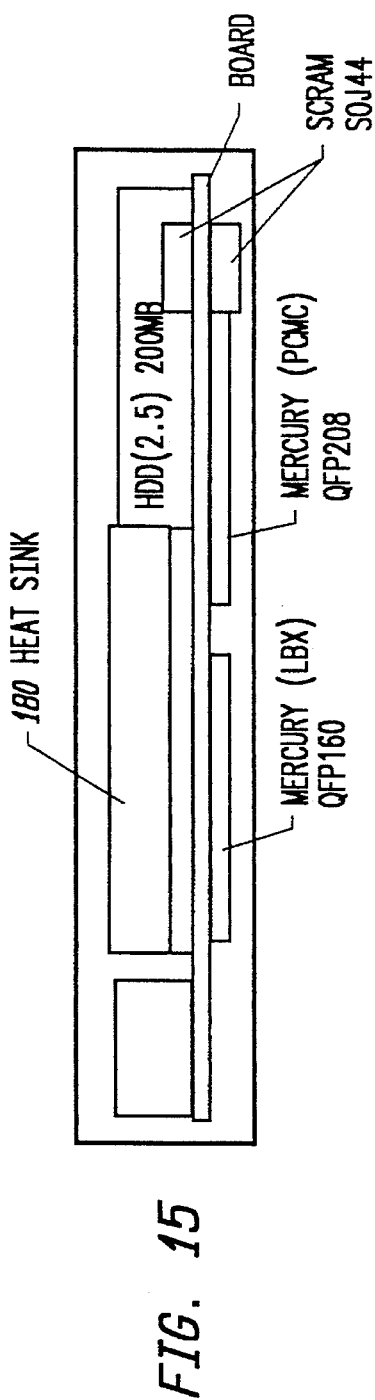
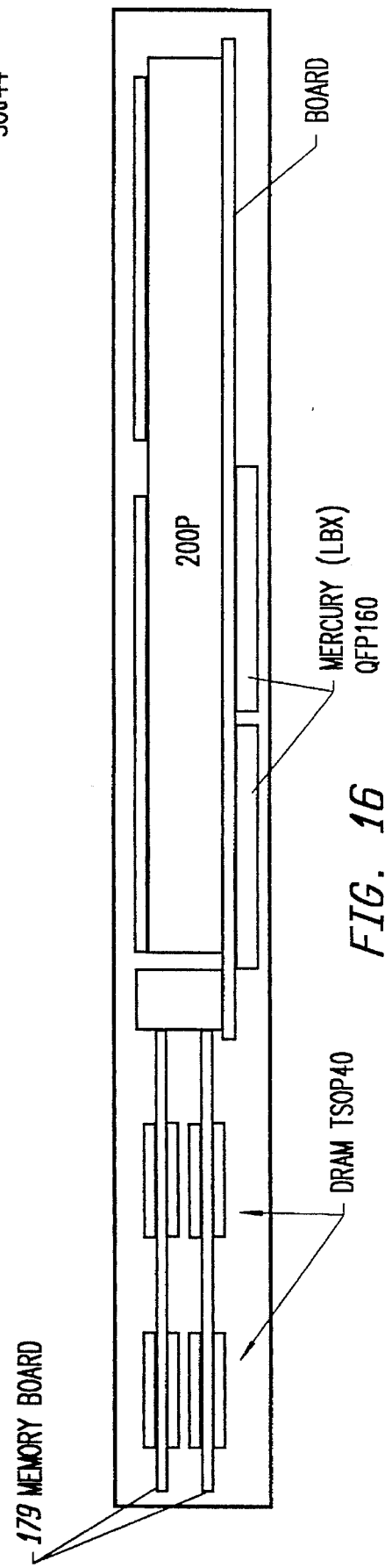

FLAG, REGISTERS IN PPM

FLAG, REGISTERS IN DOCKING STATION
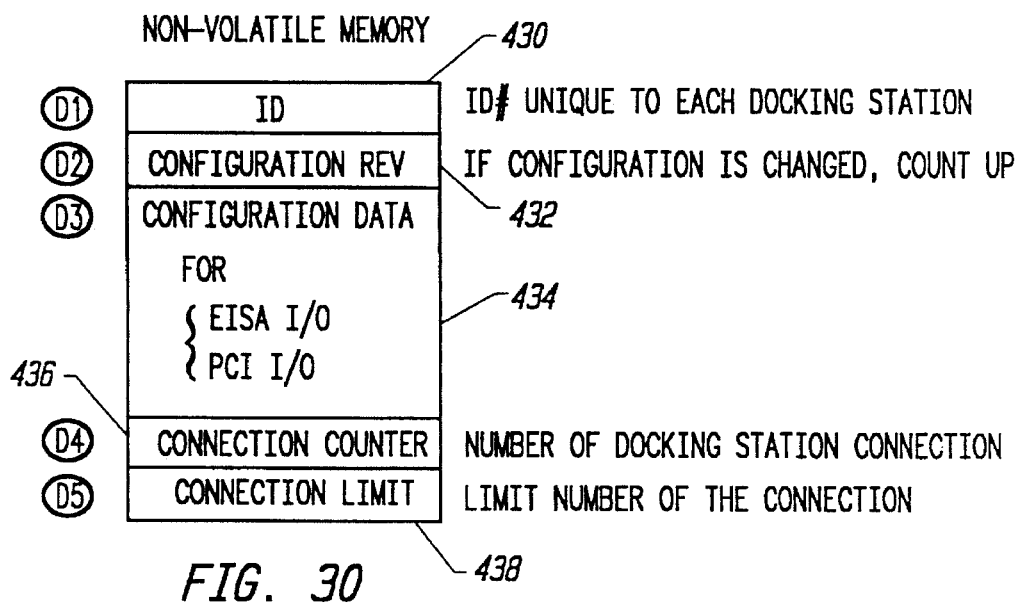
FIG. 30
CONNECT TO THE FIRST DOCKING STATION
AND INSTALL OS TO THE PPM
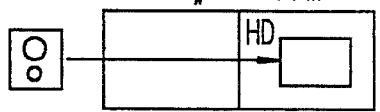
FIG. 31
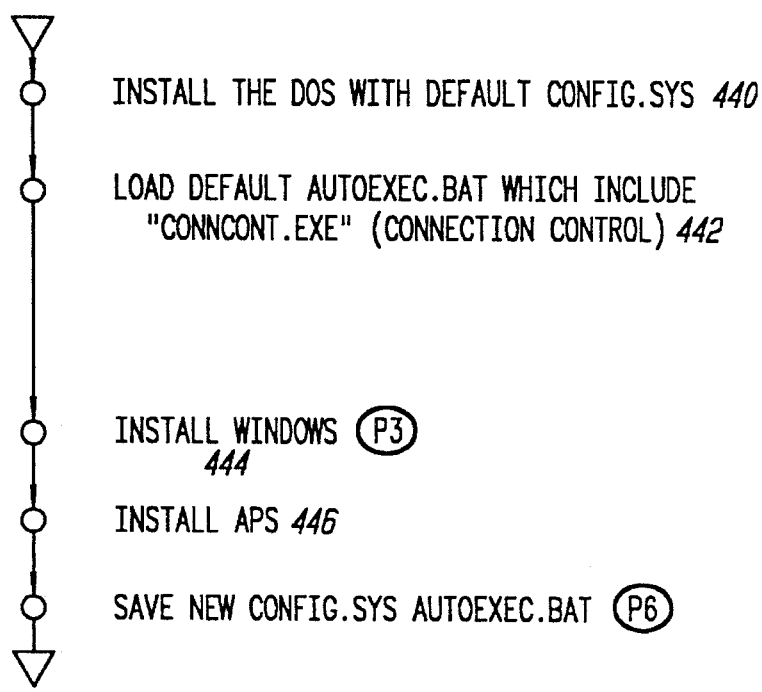

PERSONAL PROCESSOR MODULE AND DOCKING STATION FOR USE THEREWITH

FIELD OF THE INVENTION

The present invention relates generally to digital computer systems, computer systems, and more particularly to a computer processing unit which is easily transportable to be used in a variety of sites in combination with a docking station including a monitor, keyboard and various peripheral units at each site, the processing unit including operating system and application software loadable to work with the docking station.

BACKGROUND OF THE INVENTION

Computer users who work at several locations have long sought a system that they could use where ever it is convenient. Such multilocation computer users may work both at the office and at home; or may move from office to office to supervise work for several groups in different locations; or may move from building to building, for example from laboratory to library to computer room; or be telecommuters who work in both the main office and at a satellite office or at home. Up to now, such users had to either buy multiple systems, or carry a single system from location to location. Even less convenient, where it was not possible because of cost and administration time to pursue the above alternatives, such multilocation users had to work at different computers or terminals, frequently dealing with different interfaces, processors, different sets of commands, and without a ready availability of the applications and files which facilitated their work.

Rather than purchasing several personal computers and/or workstations and accompanying software for each location, it is important to find a cheaper solution. Further, rather than administering several personal computers or workstations for software upgrade or configuration changes at each location where the users work, it is desirable to find a way to save that time and expense.

It has also long been a desirable objective to increase security for the valuable parts of the computer system, such as the processing unit, hard disc, software and data from thieves or persons bent on interference with the operations of the company. It would be desirable when the computer is not in use to remove these valuable parts from the computer system in the office and keep them in a secure place.

An effort has been made to address the problems outlined above by providing portable desktop or notebook computers. However, their size is not usually less than letter size and occupies most of the briefcase because they contain minimum functions for a desktop computer including the keyboard and display and power supply. People who frequently use a computer in a fixed location and do not use it while traveling for example in an airplane or the like, do not want to carry a big module while moving from location to location. Further, they are frustrated by the reduced size of the keyboard and limited clarity of the screen. A number of forces have driven the need for the present invention. Working in several locations is increasing due to the need to support more flexible working and management styles to increase productivity and improve the work environment. Further, technological and management innovations such at networking, work group application software and the like may get easier for valued employees to work in a number of locations.

Different machines may be needed for different specific tasks performed by the same technologist. The ability to use different machines for example a desktop for one machine, a portable for another purpose is effective in increasing user productivity.

The necessity of upgrading the processor and software is increasing. Innovation in processor performance is accelerating. The operating system and application software innovations which make use of the high performance processors available increase the productivity of the users. When a user is going to be working at several different machines, minimizing the cost of the upgrade and minimizing the time needed for the upgrade can be a critical consideration.

A few but not all of these issues have been addressed in the prior art. For example, in Bite Magazine, August 1991 issue, pages 39–40 and the June 1990 issue, pages 117–118 describe a machine called "brick" and "moby brick". Both these articles disclose a concept of providing a processing unit memory and hard disc in a portable unit that can be used at several locations. The unit also includes a power supply and other elements, resulting in a unit which is so large and heavy that it is no advantage over notebook and laptop systems.

Lewist et al. U.S. Pat. No. 5,079,388 shows a computer system employing a personality module which includes the processor and memory which is designed to provide cheaper system upgrades as the monitor and keyboard can be used for a number of personality modules.

However, this module is not designed to be carried around and placed at different types of workstations or with different types of docking stations.

Hawkins U.S. Pat. No. 5,133,076 shows a computer module and expansion module; however, the computer includes an LCD screen adding to the size, weight and lack of flexibility of the system.

Cudahey U.S. Pat. No. 4,715,385 shows a patient monitoring system with a transportable module that includes processing means that can move from a permanent station to another station with the patient. It does not contemplate use with multiple different types of docking stations or a multiplicity of different docking stations capable of accepting different processors and memory configurations.

Komacki U.S. Pat. No. 4,890,832 shows a calculator with a removable processing unit including keyboard and memory which can be interchanged to provide the calculator with different functions, but in addition to being weighted down with the keyboard, does not contemplate the use of different processors and different memory configuration with various docking stations.

Galano U.S. Pat. No. 5,161,169 and the September 1990 IBM Technical Disclosure Bulletin Volume 33, No. 4, pages 38–39 show programming a communication device with a removable cartridge or module; however, the cartridge or module does not include processing power and does not attain the flexibility necessary to deal with the problems outlined above.

SUMMARY OF THE INVENTION

The above described disadvantages of prior approaches to this problem are obviated by increasing the flexibility in use of the computer by providing a personal processor module while comprises the core part of the computer, making it easy for a user to carry with them a processing unit customized for themselves. It allows the user flexibility of using different types of docking stations at different locations. The personal processor module could be used, for example, with a desk top or portable, or with a dedicated machine with special features, for example, a digitizer and plotter for a CAD system, or a video camera and synthesizer for a multi-media authoring system. The personal processor module will allow the user to carry with him the attributes of a CISC or RISC machine, or a DOS/WINDOWS or UNIX machine depending on the characteristics that he finds most desirable. In summary, according to the invention, a single user system is separated into two parts. A personal processor module (PPM) which is a transportable module easily carried with the user, and a docking station part. The two parts are connected together by a processor independent of connections such as the PC Peripheral Component Independent (PCI) Bus. Power is also supplied from the docking station to the PPM through the connector so that incorporating a power supply into the PPM is unnecessary.

The PPM accommodates the hardware and software related to personal processing capability, that is the processor or processors, the customized operating system, the graphic user interface and the application software desired by the user.

According to the invention, the user who needs to use computers of different types, or in different locations, always carries the PPM with them. The user gains access to different computers by connecting with different docking stations or a similar docking station in different locations in order to obtain the flexibility of system configuration while maintaining the consistency of the personal users configuration of the users OS and application software.

The most important facet of the PPM for its users is that it is easy to move from docking station to docking station because of its small size. It is known to be able to construct such a module having dimensions that are about 6" long, 6" wide and 1⅝" deep which would include the most advanced microprocessors, such as the INTEL Pentium, a 2½" hard disc drive, the necessary interface devices, and an alternative arrangement reduces the package to a size of 120 mm by 145 mm by 39 mm deep. In each of these sizes, the PPM accommodates the minimum components needed to realize personal processing capability. Such components are an advanced processor with related logic, memory (RAM/ROM/CASH MEMORY), a mass storage device such as a hard disc or flash memory or both to contain the operating system graphic user interface, application software and customized information personalized to the user. The PPM in a preferred embodiment also contains logic to keep the customized information such as real time clock (day, time) and logic for connection to the docking system. The PPM does not include a power supply or battery for the processor. It may contain a small battery to keep the real time clock or keep RAM data as a non-volatile memory. It does not contain human interface input/output devices and/or devices such a keyboard, display, printer and the like. The PPM works after being connected to the docking stations through a multi-connector and is capable of being connected to several types of docking stations such as desktop, desk side or portable depending on the task to be undertaken by the user. Space efficiency for the key components such as IC, LSI and Mass storage inside the PPM are improving every year and the PPM does not contain any human interface devices which require a minimum size for ease of usage. So the optimal size of PPM can be purely industry issues, i. e., driven by cost and technology at the time of manufacturing. The PPM may be reduced in size every year.

The docking station in the preferred embodiment provides the necessary environment for the PPM to work after connection thereto. The docking station will include the power supply, a fan to cool the processor, I/O devices and the interfaces to those I/O devices, display, keyboard or related input/output device, and mass storage unit.

Because of the processor independent connection, the docking station connects to several types of PPM, each of which can have any desired type of processor and any desired operating system user interface and application software.

According to this invention, the user who needs several types of computers in several locations has to provide only one processing unit and the software for it. In utilizing several types of docking stations, he does not need. additional processors and software for each machine, the more expensive the processor and software (OS and application software) are, the more beneficial this invention is. Looked at another way, the more personalized a particular needs are in terms of user interface and application software, the more beneficial the invention is as the user carries with him the unique characteristics which he needs and with which he is most familiar.

With this invention, the users always carry their own PPMs that are personal and customized. This makes it easy to share a docking station between several people with several types of customized PPM. Each person can share the same docking station, and use the computer as if it were his personally customized system after he connects his own PPM to the docking station. When an upgrade is desired, the user needs only to upgrade only his own PPM, and not a plurality of user systems. Further, a user needs to administer the software just one time for his own personal processor module. After that, he can use it with any suitable docking station, all of which will operate according to the latest upgrade and customizing provided to the system.

Finally, the security of the system is maximized by being able to keep the PPM in a safe, secure place when it is not in use.

Other features and advantages of the present invention will become apparent from the following detailed description of the preferred embodiment given with respect to the following brief description of the drawings:

FIGS. 14–17 illustrate an arrangement of components in an alternative personal processing module;

FIG. 30 illustrates the flags and registers and data stored in the docking station;

FIG. 31 is a flowchart of the sequence of steps followed in connecting the docking station for the first time in installing the operating system in the personal processing module;

DESCRIPTION OF THE PREFERRED EMBODIMENT

Figure 1:
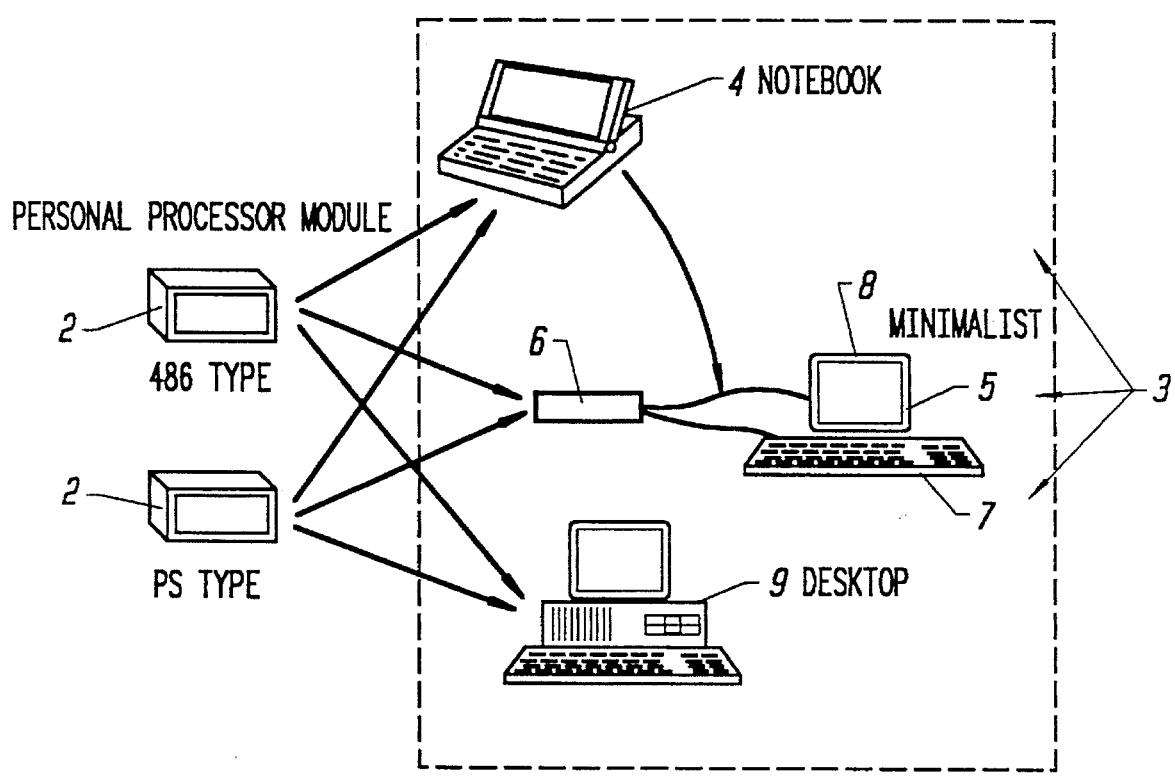
FIG. 1 illustrates the relationship between the personal processor module and a plurality of different forms of docking stations with which may be used.

Referring to FIG. 1, an exemplary personal processor module PPM 2 is shown. As illustrated therein, the PPM is intended to be easily transportable. The target size is to provide a hand held unit which would comprise a 1.3" or 1.8" or 2.5" hard disc drive, a microprocessor such as Intel Pentium, or the like, to be carried to and connected with any of a number of different docking stations.

Figure 2:
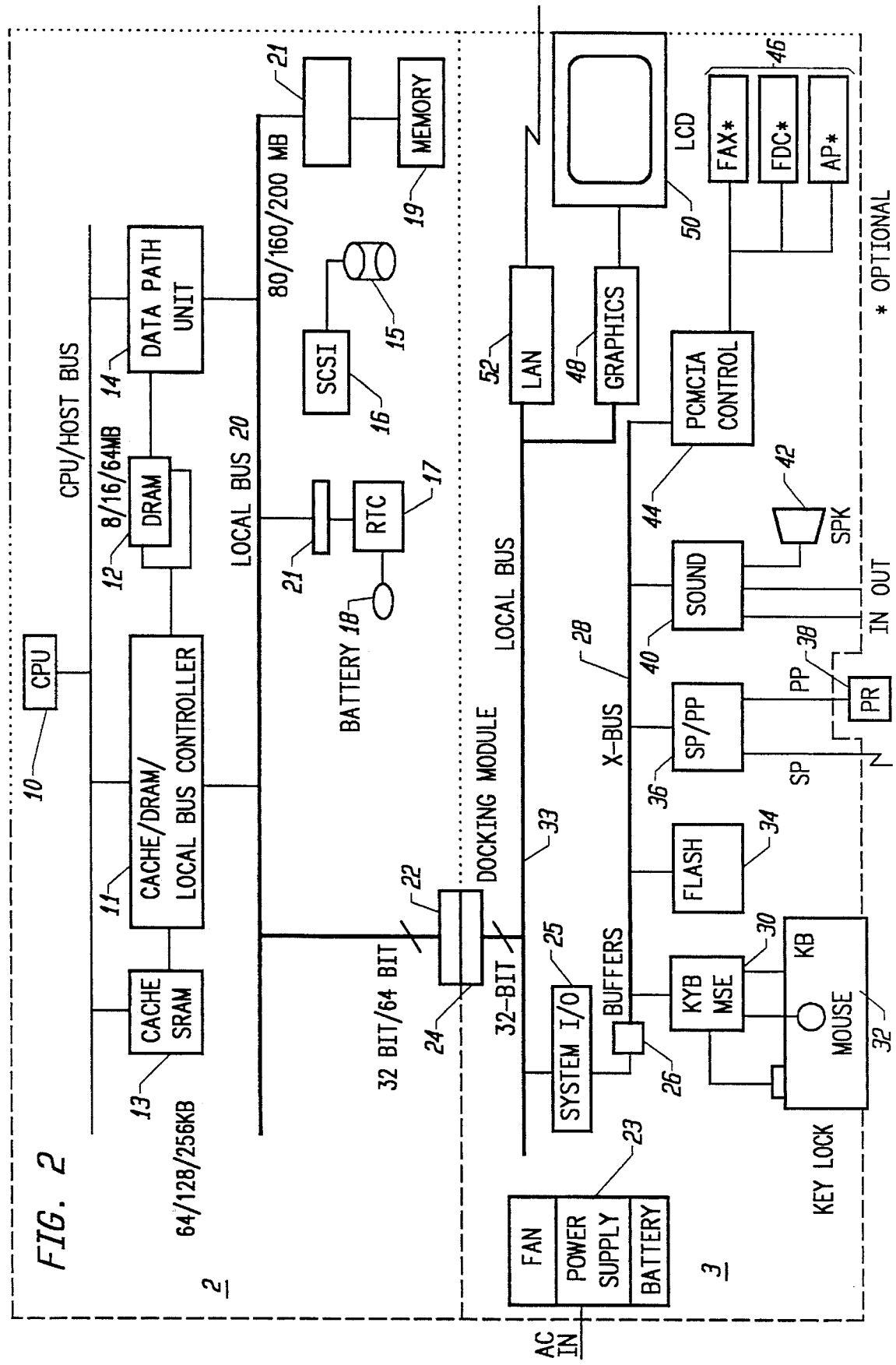
FIG. 2 is a block diagram of the relationship between the personal processor module and a typical docking station.

As shown in FIG. 1, the advantage of the PPM is that it may be utilized with any of a number of different docking stations 3 such as a notebook type docking station 4, or a minimalist configuration station 5 which would include simply, a separate docking housing 6 that physically supports the PPM 2 and an interface unit 6 that provides the power supply, logic and connector for the PPM and connections to a keyboard and monitor 8, or with a desktop docking station 9. Each of these docking stations 3 would have the physical appearance of a notebook or desktop computer, but as shown in FIG. 2, the docking station would not include the processor or the application software or operating system which are usually a part of any computer. These would be carried in and supplied by the PPM so that every docking station would present the same interface to the PPM user.

Rather, the docking station 3 includes as shown in FIG. 2, a power supply 23 which may be a battery, which powers the entire system, i.e., both the PPM 2 and docking station 3, and a bus 33 for communicating across the interface. This bus includes physical connector 24 with the PPM 2. In a typical docking station, connected to the bus 33 would be system I/O controller 25, and various buffers 26 to an x-bus 28. Connected to this x-bus 28 would be input and output means as well as storage units. For example an interface 30 to a keyboard or mouse 32, a flash memory 34 for storing configuration information for the docketing station and the I/O installed in it, a serial and/or parallel port 36 to a printer 38, and a sound generating logic 40 connected to a speaker 42 may be provided. An interface control for the standardized interface such as PCMCIA provides an interface to various optional output devices 46. Connected to the local bus 33 may also be provided a graphical interface 48 to display 50 and a local area network interface 52.

The personal processor module itself will include typically a desirable processor 10 which may be an Intel Pentium or the like, a dynamic memory and associated cache memory and local bus controller 11, 8–64 megabits of dynamic memory 12, a cache static memory 13, a datapath control unit 14, a mass memory device such as a hard disc drive 15 with an appropriate control logic 16, and preferably a real time clock 17. The hard disc 15 which would be a 1.3" or 1.8" or 2.5" drive, will store software including operating system, graphic user interface and applications along with customization configuration and data which are personalized to the user of the personal processor module 2. It is intended that the PPM 2 will store sufficient software to fully customize its operations for the holder. Though the PPM 2 expressly does not include a power supply sufficient to support normal operation of the processor and other logic, the real time clock may include an associated battery 18. PPM 2 will also include memory 19 connected to local bus 20 including ROM and EEPROM which are used to store an Initial Program Loader (IPL), BIOS, connection control data and flags. Logic 21 provides the interface from memory 19 and clock 17 to local bus 20.

As noted, the PPM 2, does not contain a power supply or battery for the system, nor human interface units, and therefore always needs a docking station to work with. However, this minimization of the elements makes it possible to realize a small transportable module having dimensions as small as 120 mm by 145 mm by 39 mm using an arrangement of storage and active elements as discussed below in order to maximize the portability of the design as well as expand the flexibility of the docking stations with which it may be used.

Figure 3:
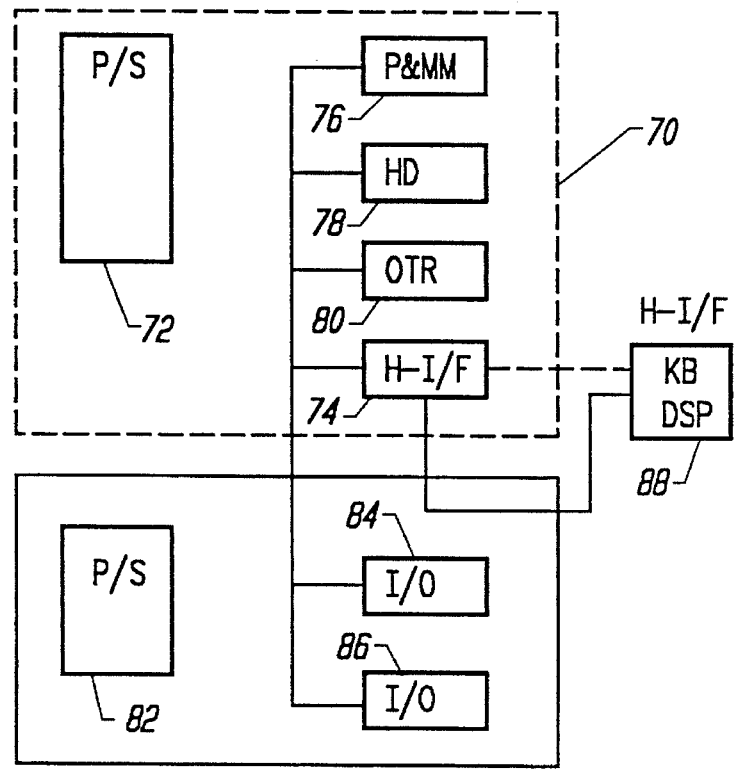
FIG. 3 is a block diagram of a prior art "Brick" or "Moby Brick" (portable desktop) modular computing system.
Figure 4:
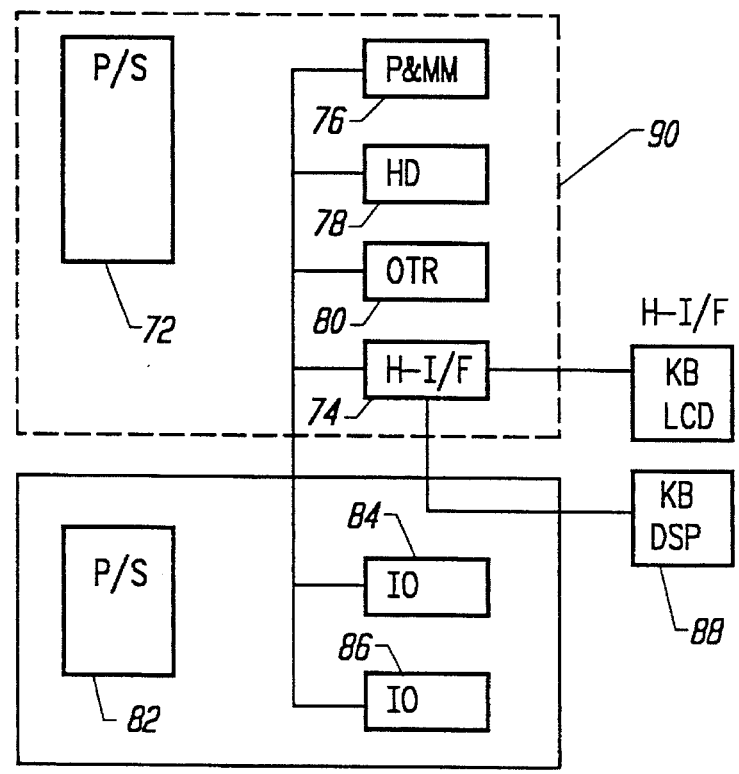
FIG. 4 is a block diagram of a prior art notebook type of computer.
Figure 5:
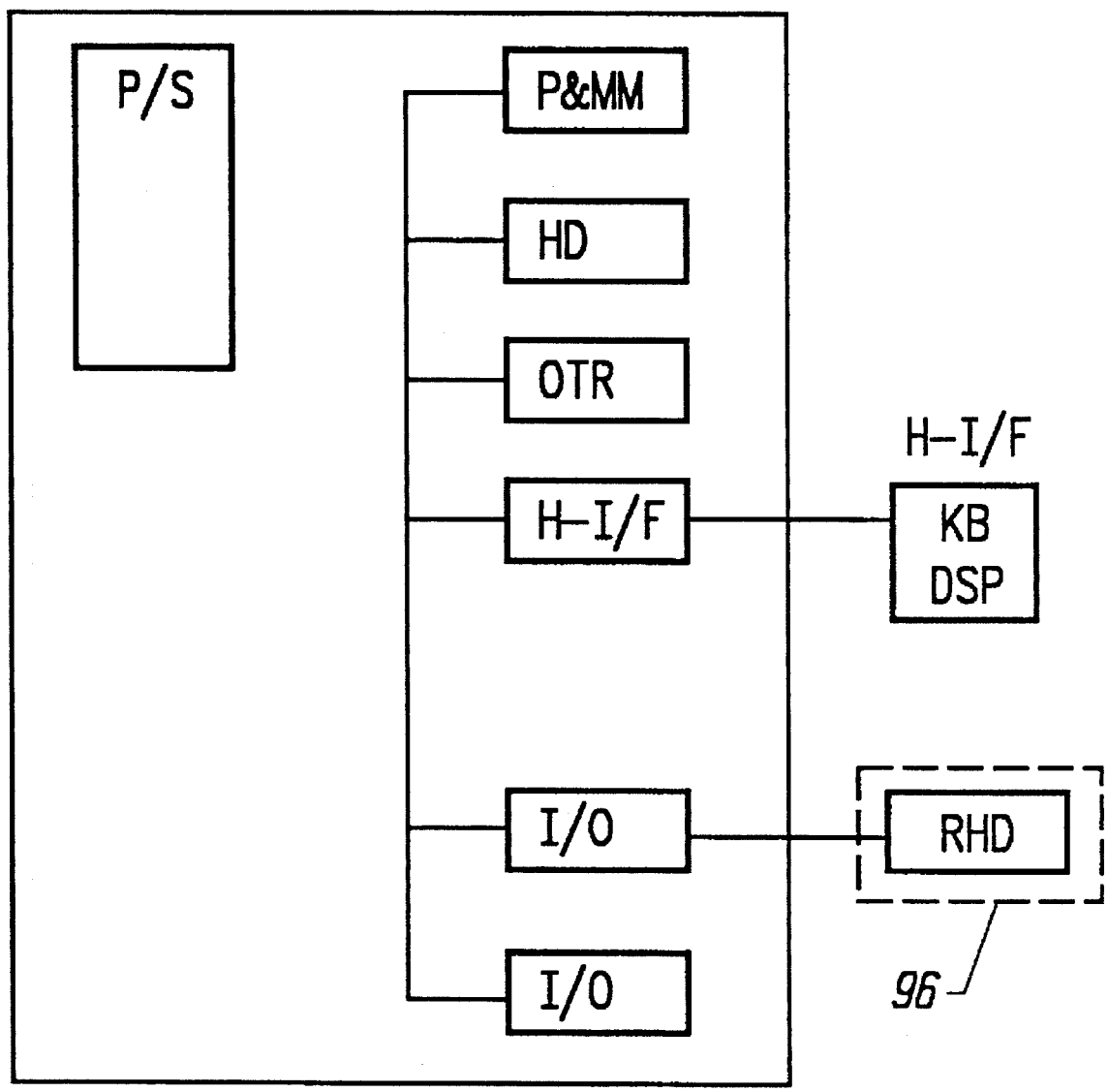
FIG. 5 is a block diagram of the relationship between the hard disc drive and a desktop type of computer.

FIGS. 4 and 5 illustrate prior art efforts to provide portability to the computer user. FIG. 3 is an outline of the functional elements provided in a typical portable desktop. The portable desktop 70 of which the "Brick" is an example, accommodates at least the minimum functions of a desktop computer. It includes a power supply 72, devices for human interface 74 such as a keyboard and display, the processor and related logic 76 that includes main memory and/or cache memory, a hard disc 78, and other logic related to connections to the outside and/or to maintain customized information 80. When used in a fixed location, it is frequently associated with another auxiliary power supply 82, and other I/O slots and controllers 84, 86 as well as perhaps a larger keyboard and display 88. However, because of its size due to the presence of the power supply 72 and other interface devices 80, it is not highly portable. Nor is it contemplated to use the portable desktop with a variety of different docking stations.

FIG. 4 illustrates the essential elements of a typical notebook computer which are essentially the same as the elements 72–80 of the transportable desktop shown in FIG.

3 with the addition of a keyboard and typically LCD display 89. It thereby contains the minimum functions to serve as an independent computer for someone who travels or works outside his office. To achieve this goal, the human interface devices such as keyboard LCD 89 are incorporated in the design carried by the user. Portability, that is, small size and light weight, is emphasized in the notebook rather than productivity with high processor performance, large size display screen and/or keyboard.

If large screens, bigger keyboard and bigger types of peripherals or I/O boards are necessary, the notebook is connected to a docking station 84, 86, 88 as shown in FIG. 4. However, the keyboard or display are small, and it is difficult for people to work with the machine for a long period. The notebook computer must also have a power supply or battery to function as a stand-alone computer, the reason for the incorporation of the power supply 72.

The size, weight and cost of notebook computers restrict their use. People working in several locations do not want to carry a large and heavy notebook with them if they do not use computer while traveling or commuting or for people who work just fixed locations. If the cost increases caused by LCD and battery is to be competitive with a complete PC, people may prefer to support two PCs rather than a notebook plus two docking stations with the power supply 82, I/Os 84 and 86 and enhanced keyboard and display 88. In summary, because of the large size and expense of the notebook computer 90, flexibility to connect to several types of docking stations is not available.

A further approach to portability and personalization is provided by a removable hard disc 96 shown in FIG. 5. A removable hard disc does not contain a processor or any other active elements for the system but is simply a removable peripheral storage unit for computer systems. Each computer must have all the essential elements, i.e. processor, interface, logic, I/O devices, keyboard and the like, all as shown in FIG. 5. This solution does not address the need to save hardware costs and upgrading costs for high end computers where the processor is expensive. Moreover, it may even be illegal to connect a hard disc with an operating system or application software stored thereon to a different computer system without a software license. Thus, the ability to use the removable disc as a transportable module for moving from station to station is extremely limited.

Compared to the prior art designs discussed above, the personal computer module is much more useful for the person who works at more than one location. There are several mechanical aspects of the design which are very important.

The packaging of the personal processor module (PPM) and selection and arrangements of the elements within the module is carried out in order to achieve portability, ruggedness, and easy mechanical interconnectability with various docking stations. The PPM is intended to be carried in the users pocket (in future models), briefcase or hands. The PPM is illustrated generally at FIGS. 6 and 7. The perspective views of these two figures show the outline of the PPM. As will be discussed in further detail below, it has been established that the central elements of the PPM could be incorporated in a module having a length 110 of 230 mm or 9.06", a width 112 of 130 mm or 5.12" and a height 114 of 23 mm or 0.91". Alternatively, by rearrangement of the components, the modular dimensions of length 145 mm, width 120 mm and height 39 mm can be achieved. In either event, the module is highly portable and easily carried by hand or briefcase.

Further, it is important that once the PPM is inserted in the docking station, that it be locked and held in place. The PPM may frequently be used by a person who is not familiar with computer operations. Such a user, when leaving his place of work at one docking station, may be compelled to grab the PPM and hurriedly remove it from the docking station. The PPM has no main internal power supply; a sudden disconnection could easily result in a loss of files or other information that the user could be working with. Therefore, it is important to provide means for locking the PPM into the docking station so that a positive command is required for the docking station to release the PPM to allow it to be withdrawn. Software and hardware which comprises means for implanting this function is discussed below with respect to FIGS. 8–22 and 27.

Figure 6:
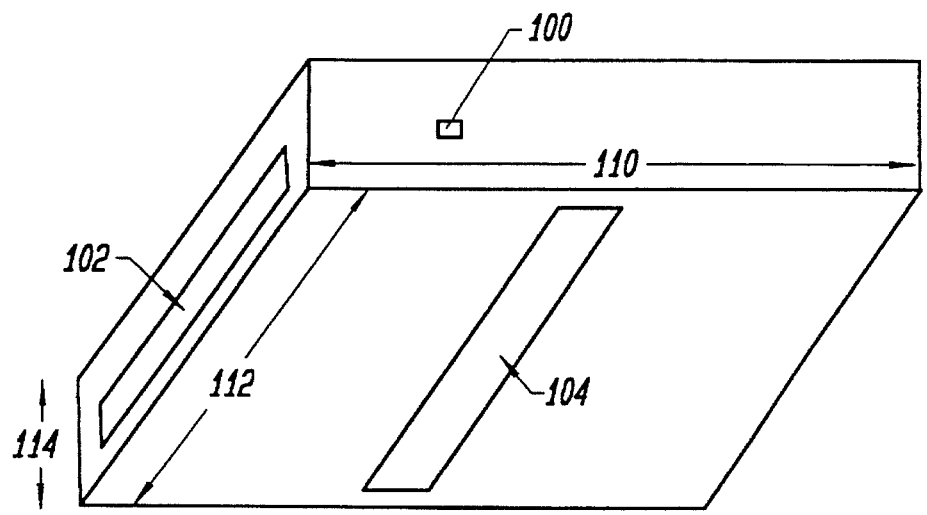
FIG. 6 is a perspective view of the processing module of the present invention.
Figure 7:
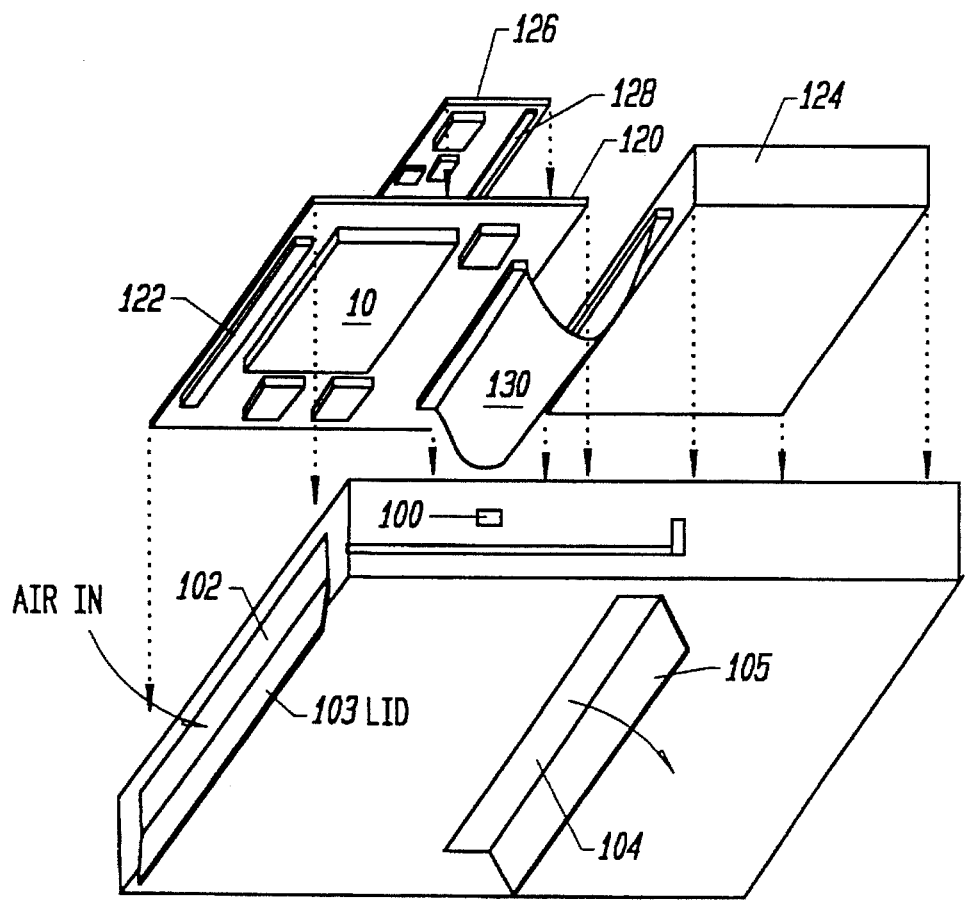
FIG. 7 is an exploded perspective view of the processing module shown in FIG. 6 illustrating the relative positioning of the internal components.

In another mechanical aspect of the PPM, there is a limited lifetime to the contact connection between the PPM and the docking station. A single PPM may be connected in a single day to several different docking stations, and this could occur on a daily basis over a long period of time. It could easily occur that the mechanical connectors internal to the PPM and to the docking station would wear out long before the expected lifetime of the long lived electronic components is exceeded. Therefore, it is advisable to have a mechanism to warn the user to exchange the contact component before the lifetime of the connector expires. One approach to doing this is to count the number of connections or disconnections for a PPM. FIGS. 6 and 7 illustrate the PPM in perspective view and show the opening for receiving an exemplary locking latch 100 and air flow openings 102, 104. It is important that the PPM be enclosed to protect it from dust, water, chemical vapors and/or mechanical stress and impact. Further, high end microprocessors typically expend a lot of electrical power, for example, the Pentium expends about 13–15 watts of power. Therefore, it is necessary to provide proper air circulation through the PPM.

The windows 102, 104 comprise the necessary means for providing air circulation. The windows would be typically spring loaded or otherwise biased or latched in the closed position so that the module is sealed closed as shown in FIG. 6 when being carried. As shown in FIG. 7, when the module is inserted in the docking station, the windows are opened so that air can flow through and cool the heat generating components. Opening the windows can be easily done either mechanically or electrically. When the PPM is ejected, the windows are closed typically by a cam action between the sides or base of the docking station and the side of the PPM. As appears at FIG. 7, when the shutters 103, 105 are opened, an air flow path past said processor 10 mounted on said main board 20 is defined.

FIG. 7 further shows schematically some of the essential electronic components to be incorporated in the PPM 6. Specifically, the processor chip 10 is shown mounted on the underside of a PC board 120 together with other interface chips and memory chips and a connector 122. The processor is mounted in this location as it is the primary heat generating source. The processor its location near the base of the PPM and most directly in the air flow path from the air intake window 102 to the air exit window 104 allows for efficient cooling of this heat generating device.

The mass storage device 124 (a hard disc) is shown mounted to the rear of the housing adjacent the sides and base thereof as it is a sealed device without as great a need of cooling.

An additional board 126 for supporting logic and memory is shown above the main board 120. This additional board is connected by connector 128 to a connector not shown at the rear of main board 120. The main board 120 is itself connected to the mass storage device 124 by connector 130. This arrangement of devices incorporates the essential elements of the PPM 2 shown in FIG. 2 into a highly portable module.

Figure 8:
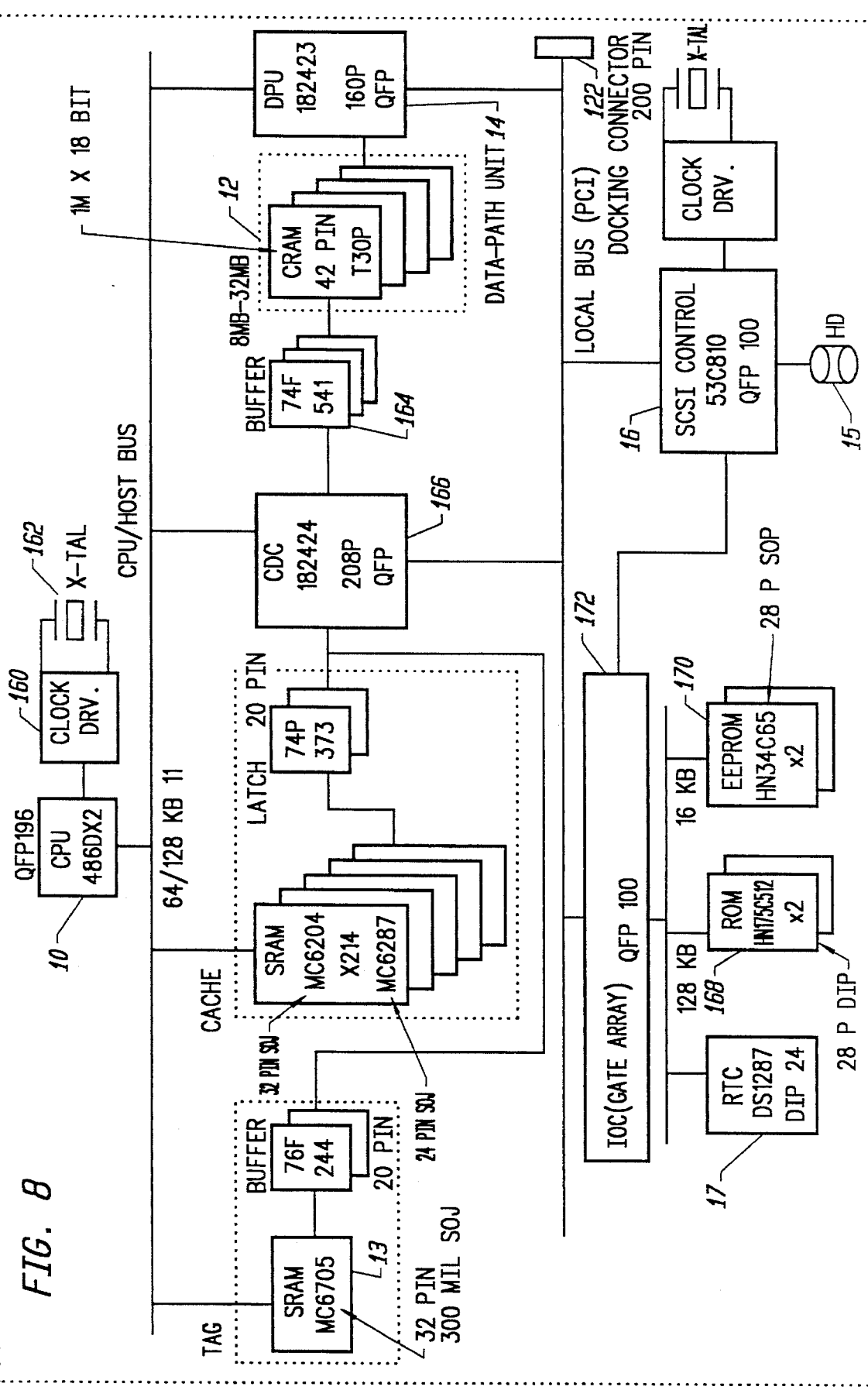
FIG. 8 is a block diagram of a working example of specific components used in a personal processing module.
Figure 14:
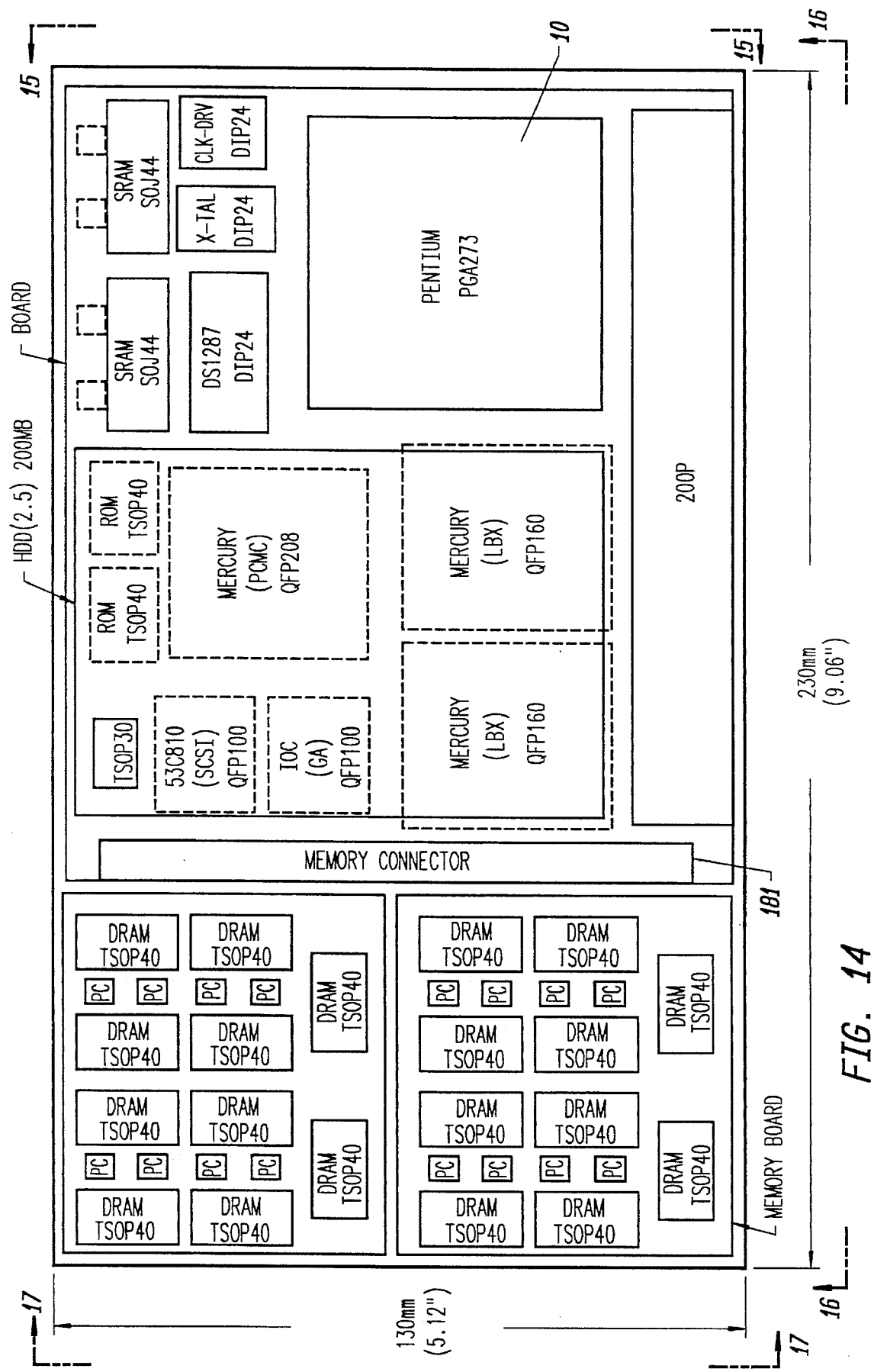

FIGS. 8–17 illustrate two alternative approaches to incorporating all of the essential elements of a personal processor module to PPM 2 into a compact design which is highly portable and efficient to move from one docking station to another. FIG. 14 is a more detailed block diagram of the essential functional components of PPM 2. The block diagram includes the CPU 10 with an associated clock driver 160 and crystal 162. A static RAM 13 and cache 11 are provided along with the data path unit 14 and dynamic memory 12. The necessary buffer unit 164 for buffering data between the DRAM 12 and the cache DRAM controller 166 is also illustrated. The PPM 2 also includes the hard disc or SCSI controller 16, associated with hard disc 15 and real time clock 17. FIG. 8 also illustrates ROM 168 and EEPROM 170 which are used to store an Initial Program Loader (IPL), BIOS, connection control data and flags the use of these programs and flags will be discussed in greater detail below. They comprise the means for controlling the connection of the PPM to the docking station, including the PPM, and establishing the electrical interface between PPM and the docking station. These devices are accessed through IOC controller 172. The physical location of these devices appears at FIGS. 9, 10, 11, 12 and 13.

Figure 9:
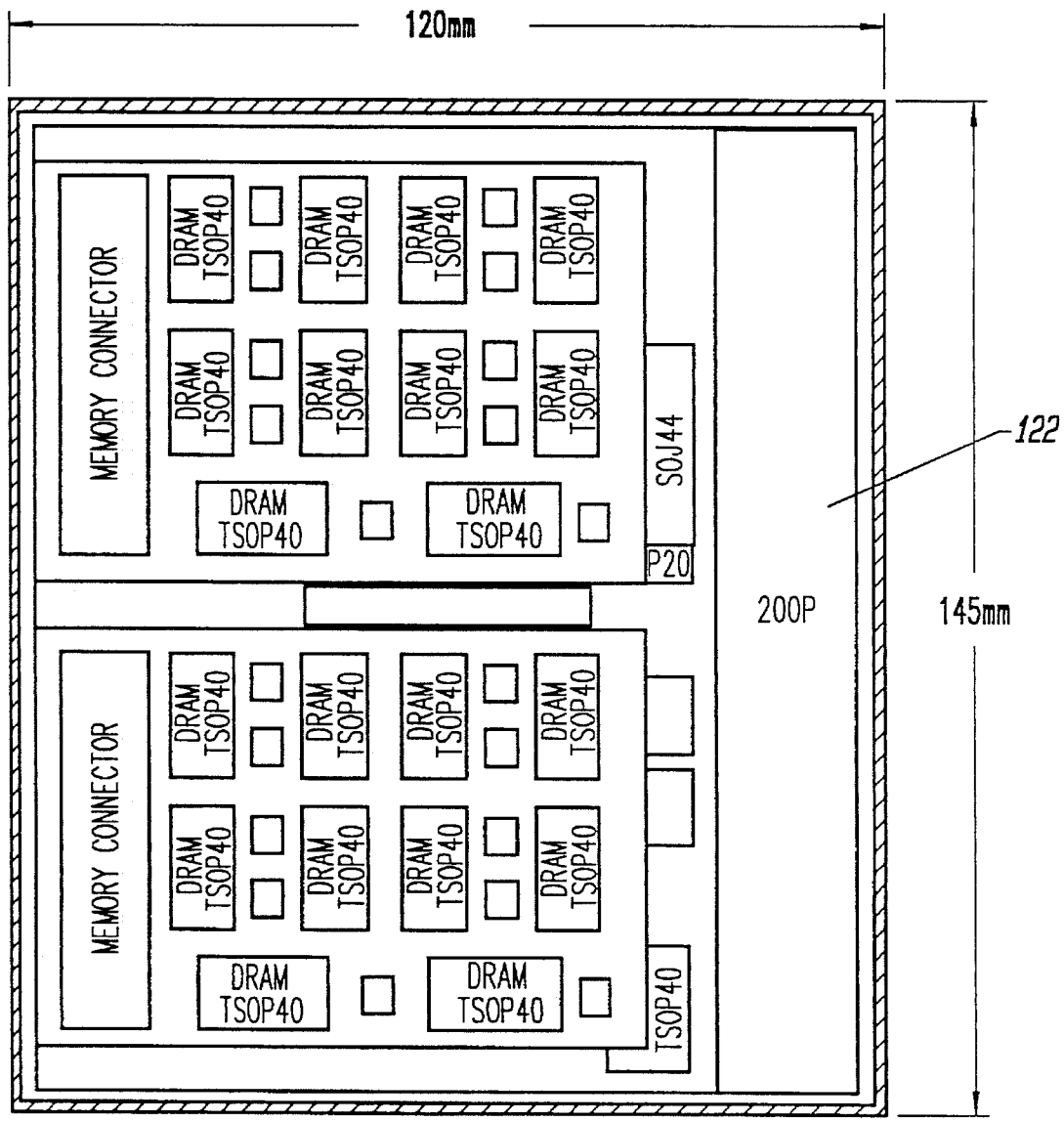
FIGS. 9, 10, 11, 12 AND 13 illustrate the arrangement of components in an exemplary personal processing module.
Figure 10:
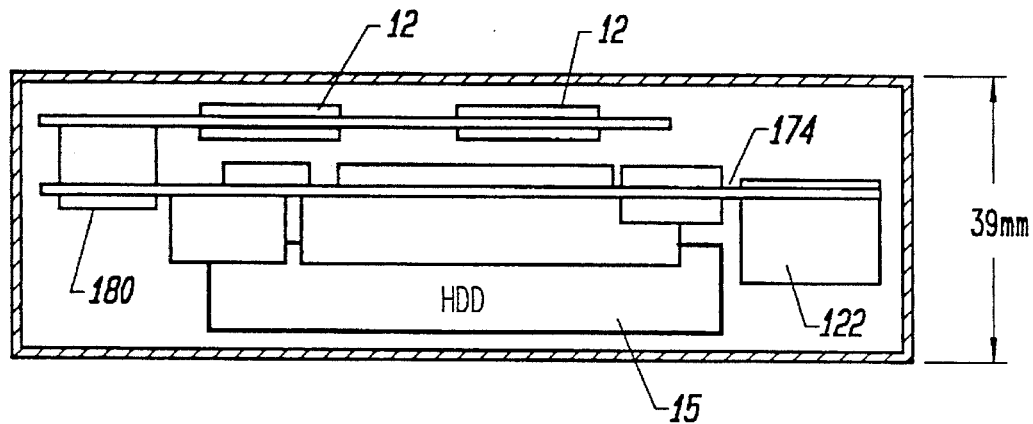

The docking connector 122 appears in FIGS. 9 and 10 to the side of PPM 2 so that it easily interconnects with the internal connector docking station; it also must be supported from a PC board 174 in a manner which allows its easy replacement. This can be done using well known technology. As will be discussed below the connector may well wear out long before the other components of the PPM and so the ability to replace the connector is important.

The hard disc drive 15 is shown located adjacent the bottom and one end of PPM 2 as it is the largest single physical unit that is in less need of ventilation. Such ventilation must be provided especially to the processor 10 and the memory units 12 which are mounted on the memory board 179 above the disc drive (FIG. 10). Appropriate connectors 180 are provided between the memory boards.

Figure 11:
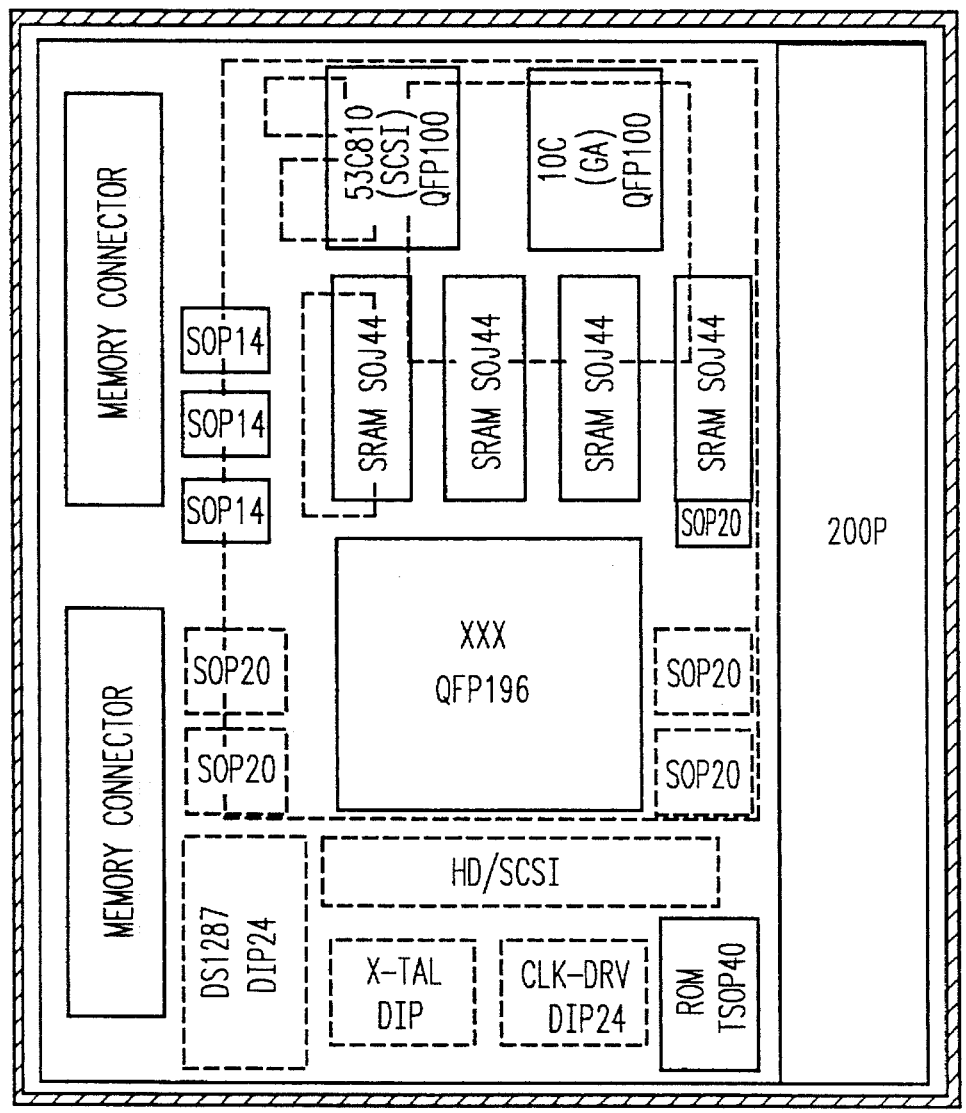
Figure 12:
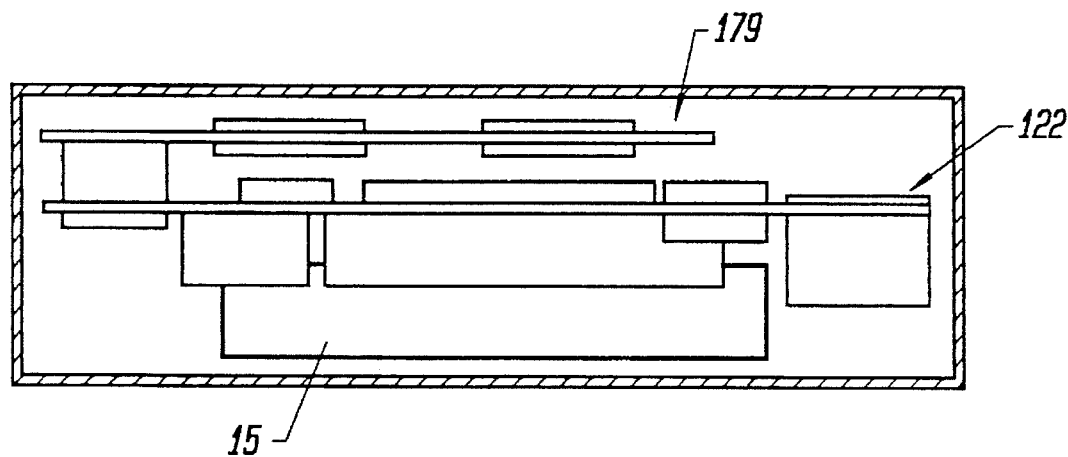
Figure 13:
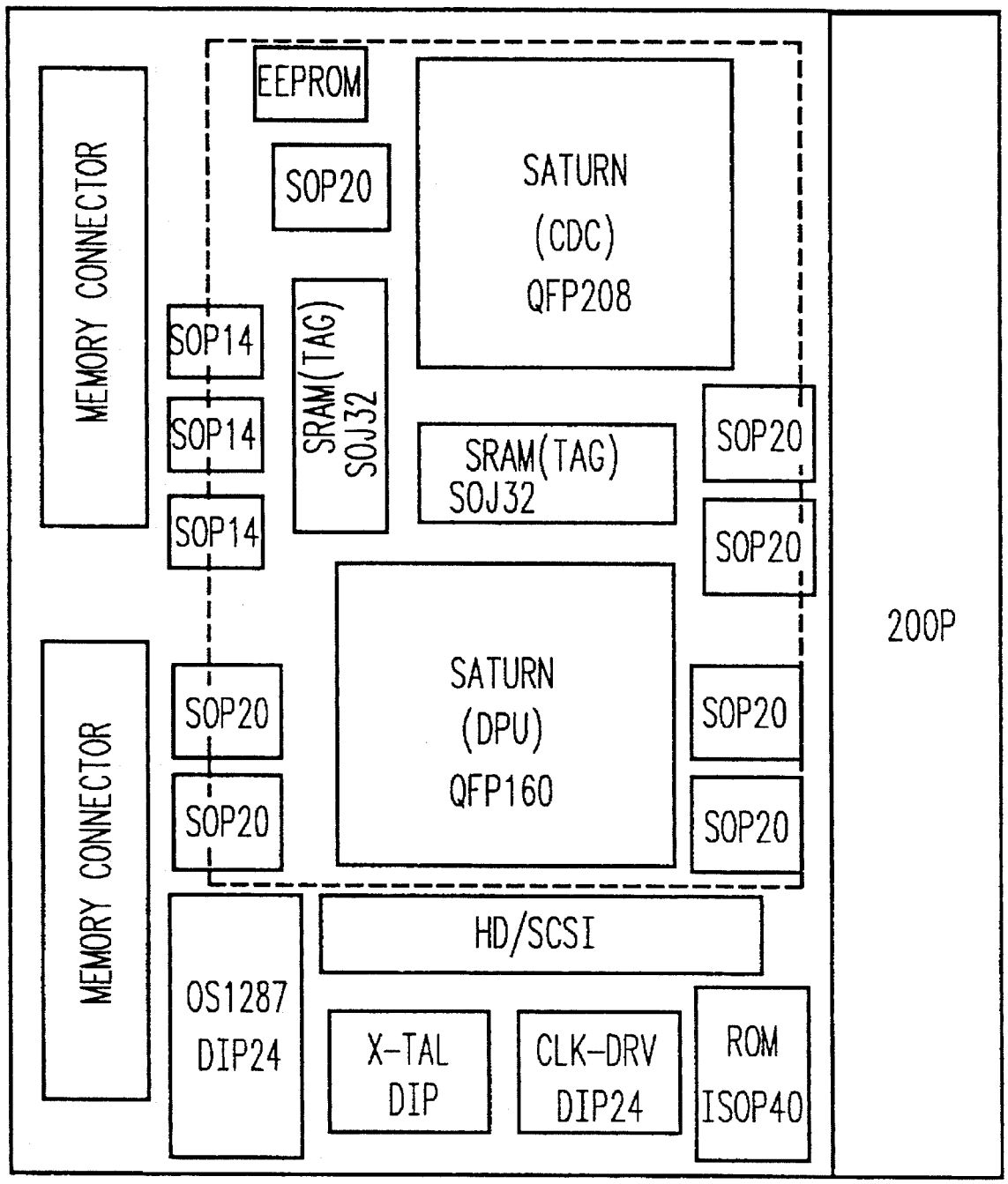

FIG. 11 shows another top view of the PPM but now with the memory board supporting the DRAM removed so that the static memory and other interface devices and logic can now be seen. Thus FIG. 17 is a top plan view of the main board 174 of the PPM. A view of the underside of the main board and the devices mounted thereon appears in FIG. 13. As is illustrated on these figures, the arrangement shown in this set of FIGS. 9–13 results in a package of 120 by 45 mm and 39 mm deep.

In an alternative approach involving a rearrangement of the elements as shown in FIGS. 14–17, the height of the package shown in FIGS. 14–17 can be reduced, but the overall length and width are greater. In the PPM shown in FIGS. 14–17, the dynamic memory boards 179 are now mounted to one side of the other elements in the PPM and connected by a memory connector 181 to the remaining part of the system. The microprocessor 10 illustrated is typically a Pentium microprocessor or equivalent and is mounted at one edge of the system, atop a heat sink 180 (FIG. 15), and adjacent the location of the hard disc drive 15 which is most clearly shown in FIG. 21.

A docking station 130, schematically illustrated, is next described with reference to FIGS. 18–22. The process is illustrated schematically to find the essential sequence of operations. The actual physical mechanisms that are used to move and lock the PPM in the docking station might of course be easily altered and adapted to meet the physical constraints of a particular docking station.

Figure 18:
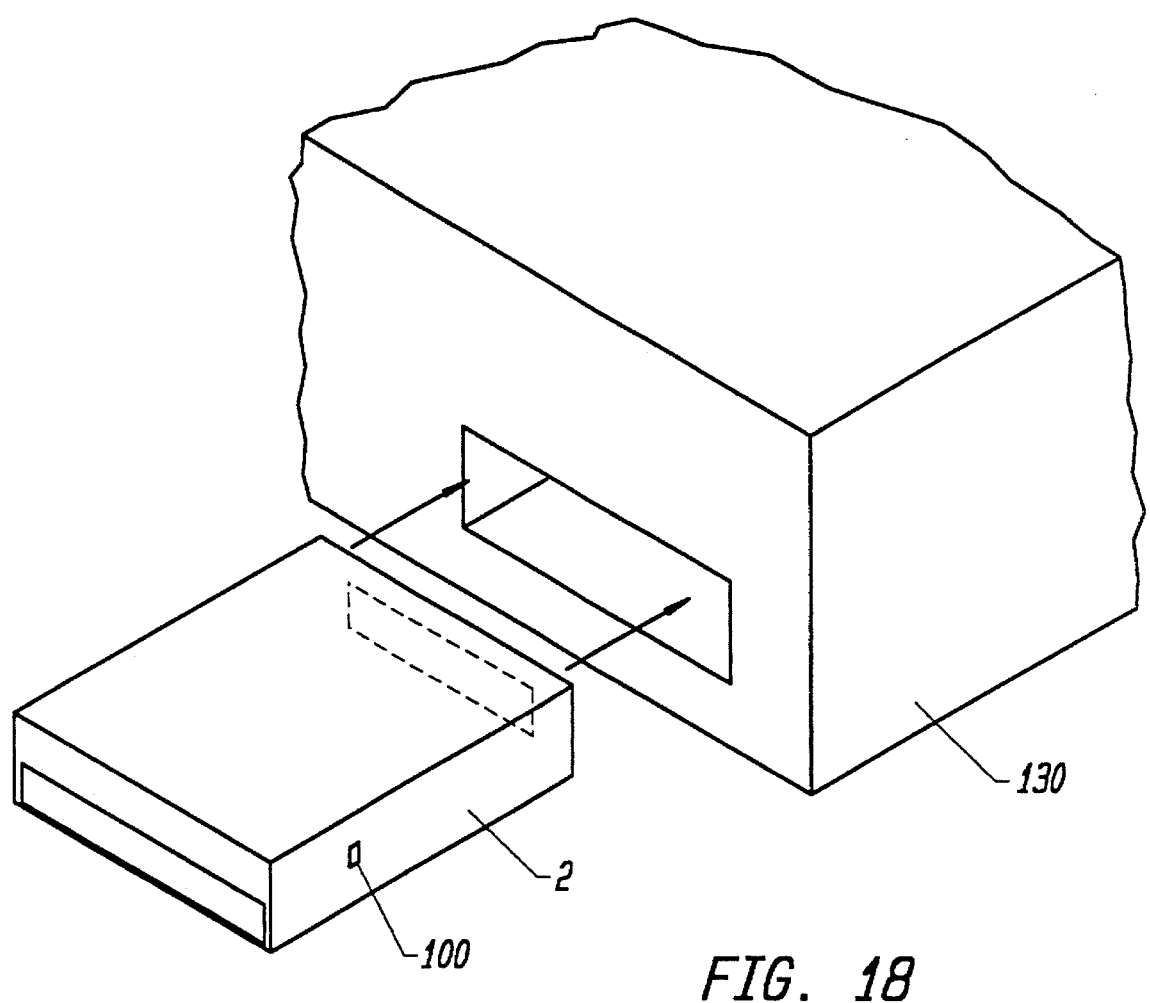
FIGS. 18–22 illustrate the sequence of steps in physically inserting a personal processing module into a docking station.
Figure 19:
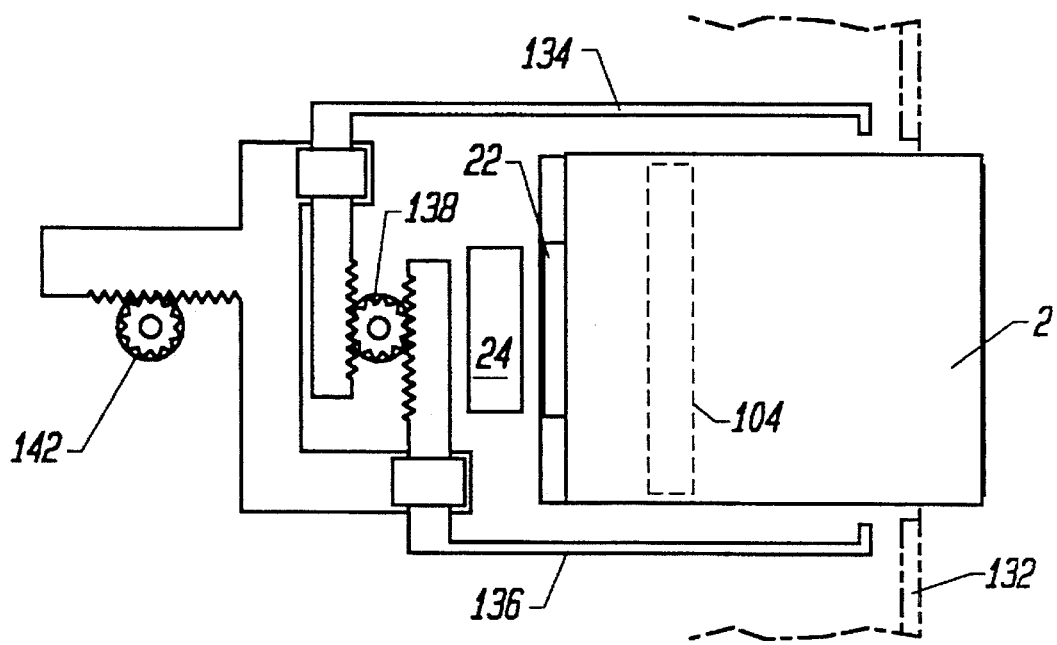
Figure 20:
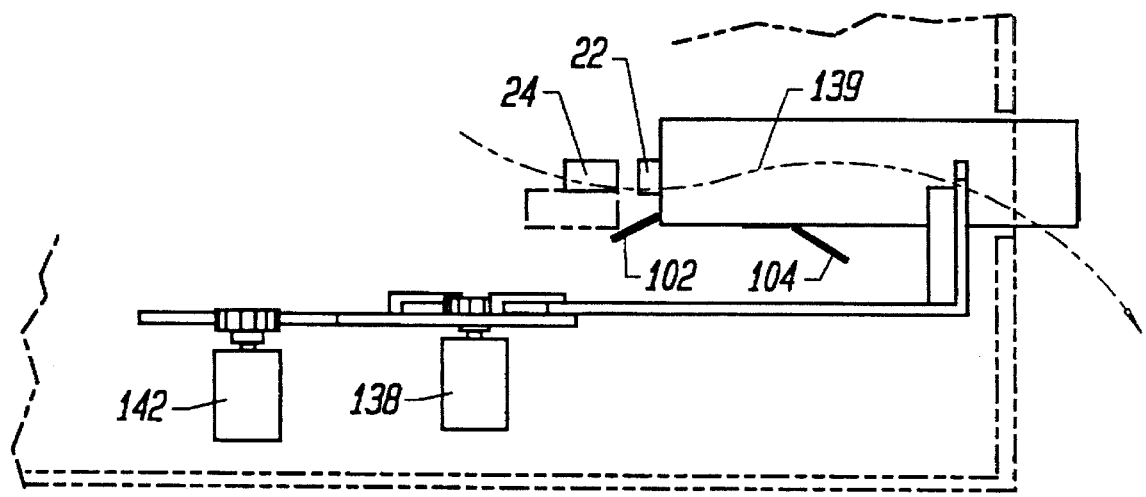

In FIG. 18, the PPM 2 is shown being inserted into the docking station 130. In FIG. 19, the PPM 2 is shown manually inserted inside the front wall 132 of the docking station 130 and between the arms 134, 136 which will be moved laterally by the motor 138 to grasp the sides of the PPM 2 and hold it in the docking station 130 while the PPM is activated. In this way, the PPM2 cannot be inadvertently or impulsively withdrawn while in use. As shown in FIG. 20, the ventilation lids 102, 104 are now open so that airflow (represented by arrow 139) to cool the internal components of the PPM is now available.

As also shown, the PPM connector 22 extends slightly beyond the end of the PPM 2 so that it may interface with the internal connector 24 in the docking station.

Figure 21:
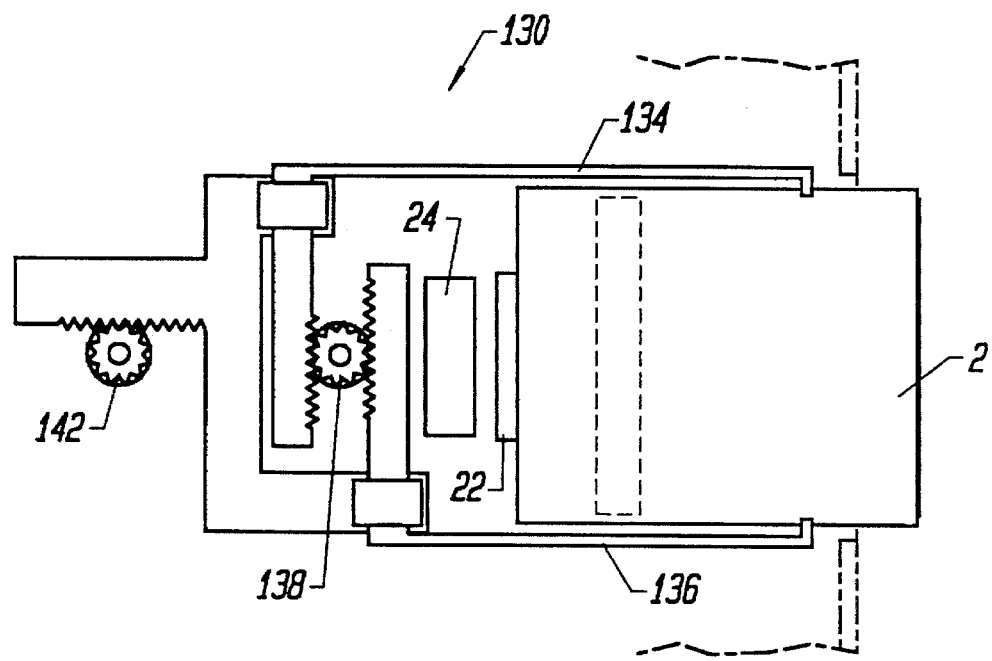
Figure 22:
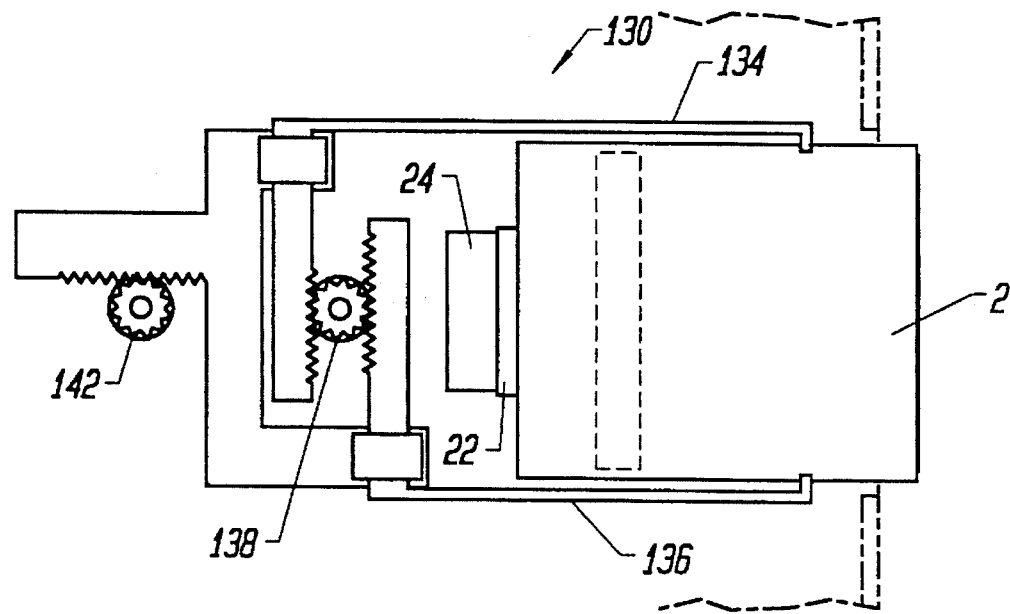

As shown in FIGS. 21 and 22 under the urging of a second motor 142, the arms 134, 136 are withdrawn further into the docking station 130 so that the connector 22 on the exterior of the PPM 2 engages the connector 24 in the interior of the docking station 130. In this way, the electrical connection is firmly made between the PPM 2 and the electronics and main power supply in the interior of the docking station so that the PPM may be energized and the activation sequence to be discussed below begun. As shown in FIG. 20, all these mechanical elements are located below the path of travel of the PPM 2 so that the connector 140 can be easily connected to the internal elements of the docking station. The arrangement and support of the various components (shown in block form in FIG. 2) within the docking station is a matter of known skill in this technology and is not discussed further herein.

The PPM may be connected to several types of docking stations as discussed above with reference to FIG. 1. The control software must also take into account that the PPM will periodically be connected to a new docking station that it has never been connected to before. In connecting with such a docking station, it may be necessary for users to do set up and customization related to the new configuration of the docking station for their system software and occasionally for application software. The operations to be followed should be clear for users to employ the PPM and docking station easily. Moreover, a PPM user will not want to repeat this operation every time they connect to a docking station. Many of the above considerations are taken into account as will be explained in further detail below with respect to the following flow charts.

The details found in the flowcharts are of sufficient specificity that a person of skill in the art of computer programming could easily follow them in drafting the specific software needed to implement the activities described. This software and the customized information base stored in each PPM comprises the means for customizing the PPM to work with each docking station, regardless of its configuration. Further, once the customization operation has been completed for a given PPM and docking station, the operation need not be repeated.

The connection control software of the PPM includes means for saving multiple customization data sets relating to different docking stations that the PPM is able to connect with both from the standpoint of the docking station hardware and the software of the PPM. For example, the setup and customization operation of the operating system and application software in a given PPM may be done differently from docking station to docking station because of the I/Os installed in each docking station.

After connection to the docking station, the connection control software should check to see whether it is necessary to execute a set up and customization operation for the docking station. If a docking station is new to the PPM or there are changes in the configuration of a docking station (e.g. by deleting/adding to the I/O) this set up and customization operation is necessary. If customization data for the docking station already exists in the PPM, the connection control software will use the stored connection data set and do the necessary control steps to start the system software and the application software of the PPM. For example, if a PPM is storing the DOS/Windows system, the connection control software will prepare the necessary EXEC files and set up/customize parameters for the docking station such as autoexec.bat, config.sys, etc. Thereafter, the system software of the PPM will begin its operation.

Each PPM needs to recognize the difference between each docking station if each docking station. Therefore each docking system includes some nonvolatile memory commonly readable by the PPM related to the configuration of that docking station, ID number unique to the docking station, and revisions to show what modifications of the hardware configuration have been done at the docking station and the date of the hardware configuration revision.

The software should also be capable of taking account of the fact that there is a lifetime to the number of mechanical connections. Connections are usually guaranteed for a limited number of connections and disconnections. It is important to exchange the connector in the PPM or docking station before reaching the guaranteed number in order to ensure the reliability of the connection. The mechanism is necessary to count the number of connections both for the PPM connector and the docking station connector and to warn the user to change the connector in either unit before the guaranteed number is reached. This function can be implemented either mechanically or by using software.

Figure 23:
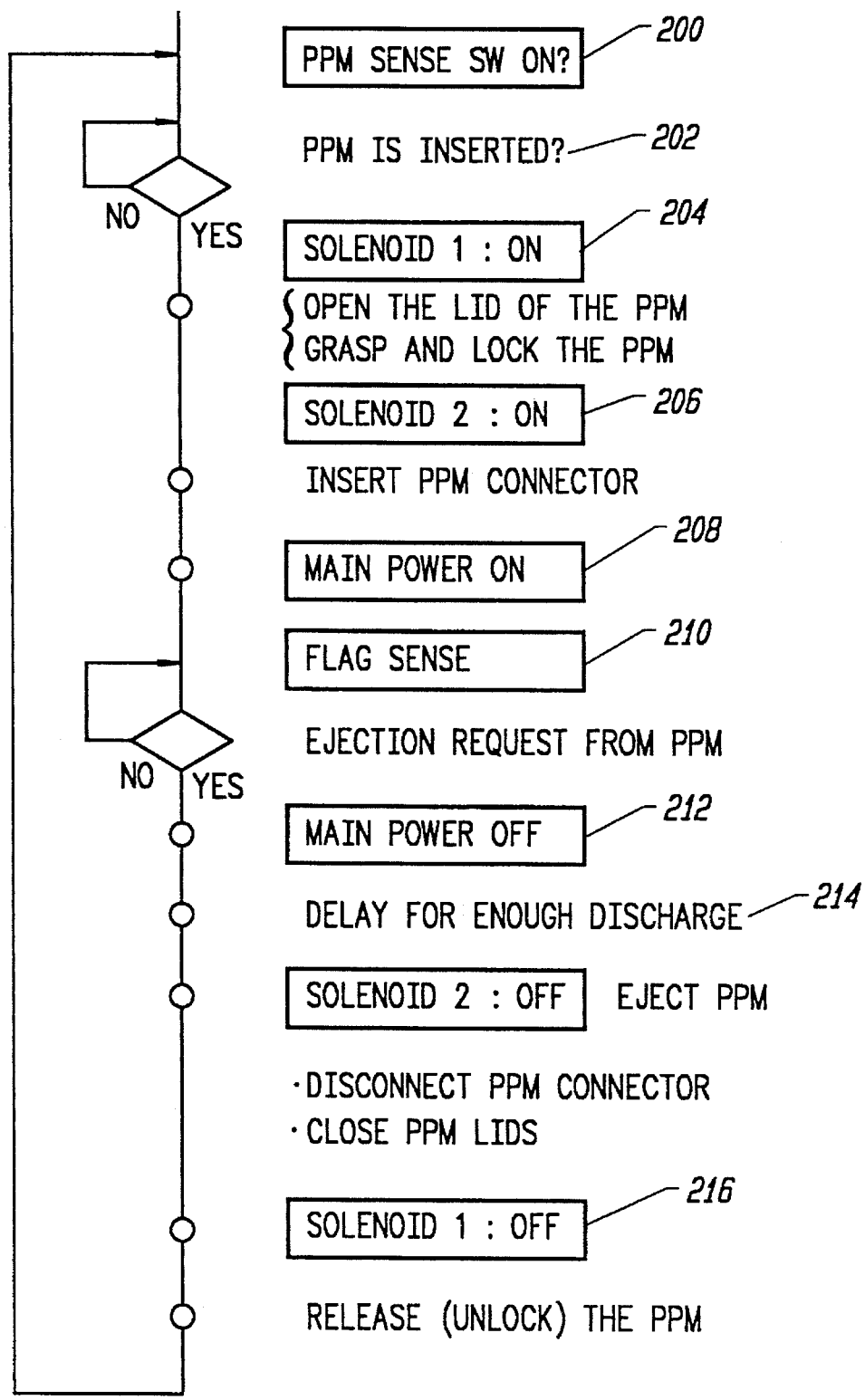
FIG. 23 is a flow chart of the general sequence of steps followed by the docking station controller.

The first software flowchart to be considered is shown in FIG. 23 and comprises the means for locking and connecting the PPM in the docking station.

Figure 24:
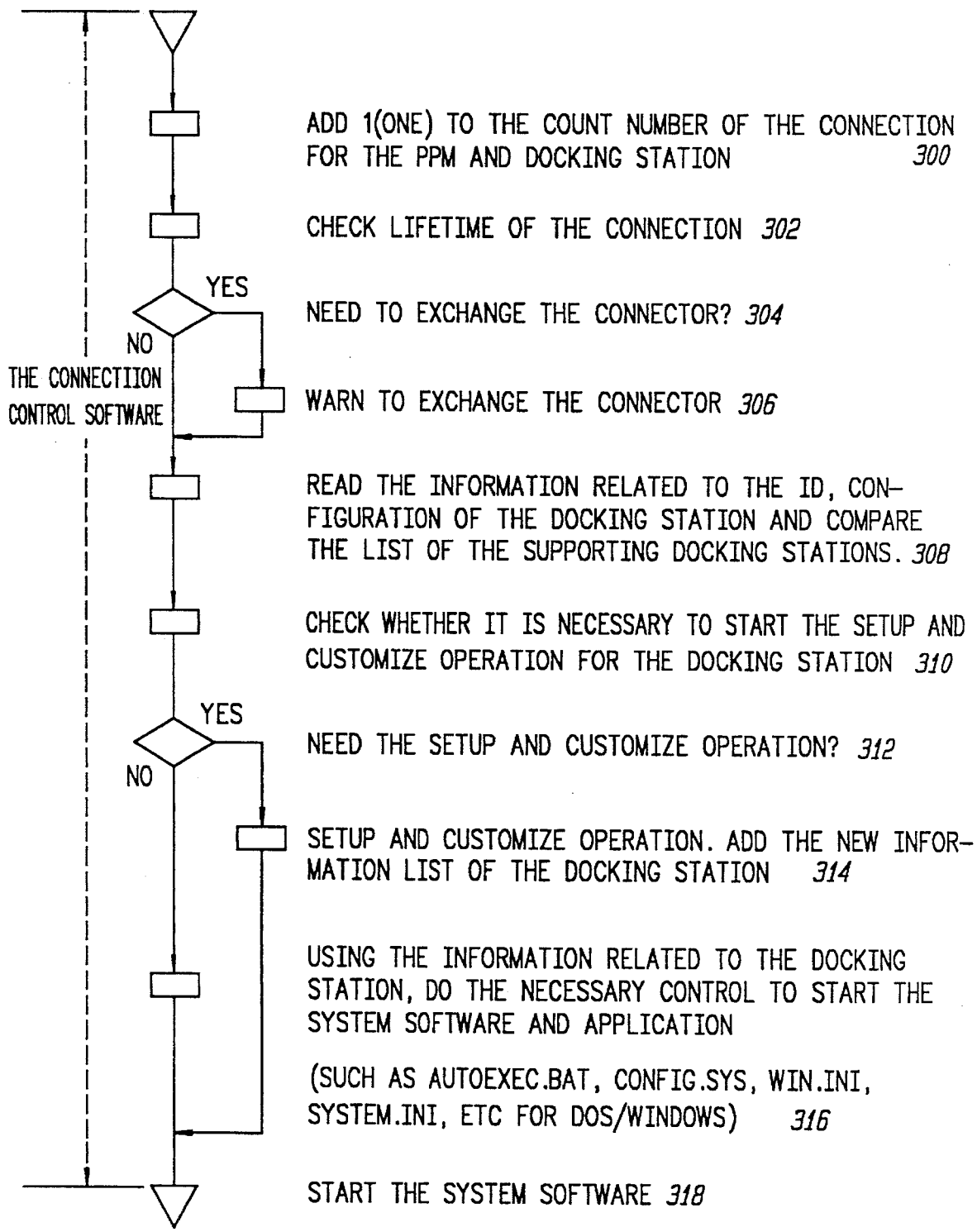
FIG. 24 is a block diagram of a general format of the sequence of steps executed after connection between personal processing module and the docking station.

The mechanical sequence has been described with respect to FIGS. 18–22. The software control sequence begins by the software periodically checking 200 to see that the PPM switch is on, as this is the switch that detects the insertion of the PPM into the docking station. Loop 202 is periodically checking to detect the insertion of a PPM so detected by the PPM sense switch (320 in FIG. 26). When a PPM is detected, motor 138 is turned on 204, opening the lid of the PPM to allow for airflow and causing grasping and locking of the PPM in the docking station. After a time delay, motor 142 is turned on 206, causing the insertion of the PPM connector 122 into the docking station connector 140. After insertion, main power is turned on 208 to supply power from the docking station to the PPM 2. Thereafter, this subroutine goes through a periodic loop 210 looking for a flag set on receipt of an ejection request to eject the PPM. On detection of the flag, the main power is turned off 212 and after a sufficient time delay 214 to allow for data storage and the like motor 142 is turned on, causing disconnection of the PPM connector from the docking station, then motor 138 is turned on 216, unlocking the PPM. The PPM now be withdrawn by the user. FIG. 24 illustrates a general format for a sequence that needs to be followed to establish electrical connection and configuration between a particular PPM and the docking station to which the PPM is now connected. The details of many of the sequence will appear and be explained with respect to the following figures.

When the PPM and docking station are connected (or disconnected), means are provided for adding 300 one count to the count of the connections for the PPM and the docking station, both of whose lifetimes must be monitored. (As explained with respect to FIG. 34, this may also occur just prior to ejection of the PPM). The lifetime of the physical connector is checked 302; if it is time to change the connector 304 then a warning appears on the display screen to exchange the connector 306. After this connection monitoring sequence has ended, the start up sequence which sets up the docking station according to the format desired by the user executed. This sequence includes reading 308 the information related to the ID of the PPM and the docking station, the configuration of the docking station and comparing the ID of the docking stations to the list of docking stations already supported by this PPM. This comparison is necessary to check 310 whether is it necessary to start the set up and customizing operation for the docking station now being used by the PPM. Where the set up and customization operation is needed 312, the loop for set up and customizing 314 is entered; after the customizing operation, the fact that the PPM has worked with this docking station is recorded in memory so that this set up only needs to be done once. If the answer or need for set up and customizing 312 was no, then the stored information from registers in the PPM relating to the docking station is used 316 to execute the necessary sequences to start the system software and applications such as autoexec.bat, config.sys, etc. for DOS/WINDOWS or whatever operating system and applications the user has stored on his PPM2. When the docking station is configured then the system software begins operation 318.

Figure 25:
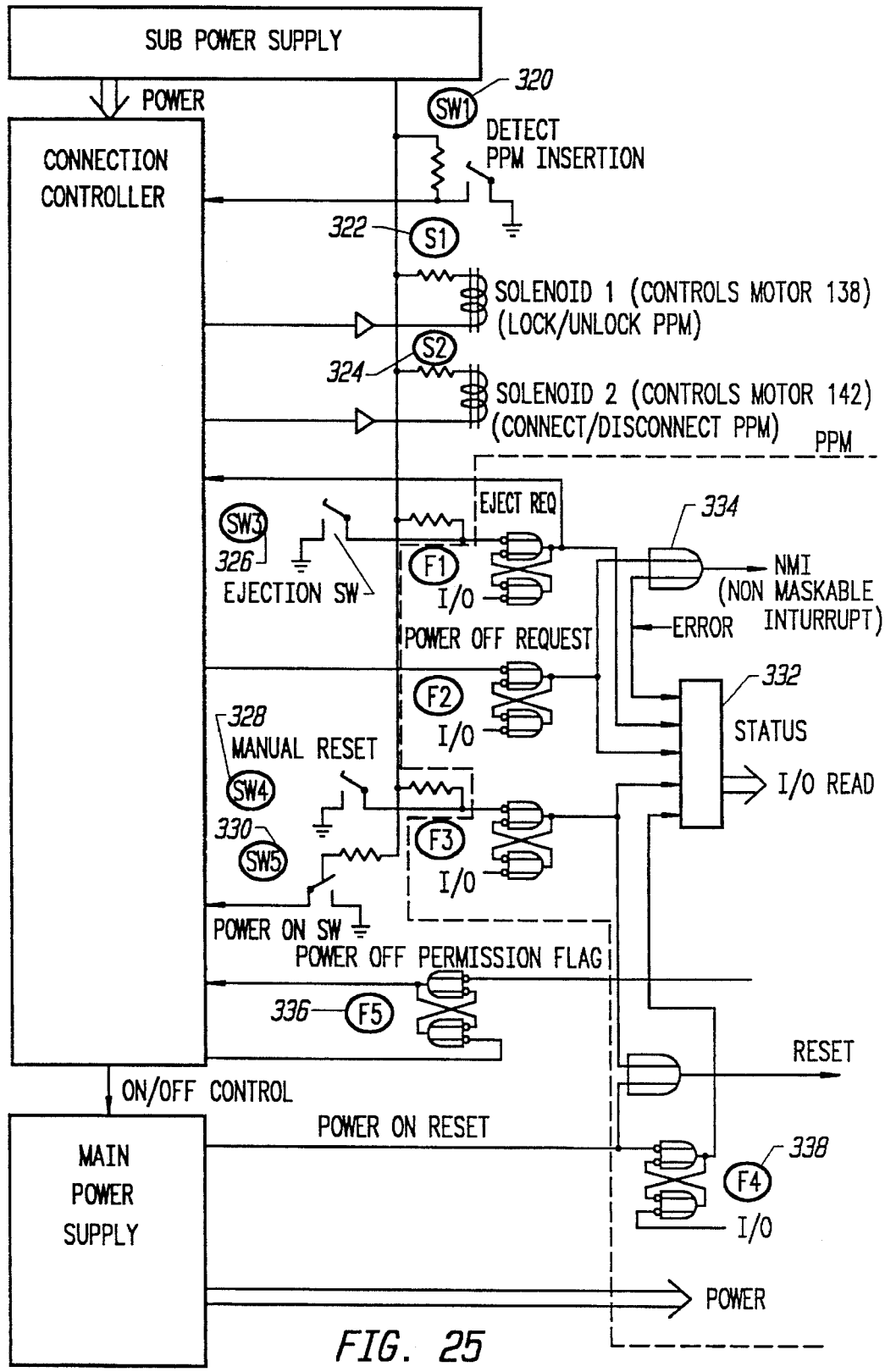
FIG. 25 shows flip flops and the like used to control the connection between the docking station and the personal processing module.

FIG. 25 illustrates the necessary switches and solenoids and the like to control electrical and physical connections between the docking station and the PPM. A switch SW1, 320 is provided in the docking station to detect the insertion of the PPM. On detection of the PPM2, the connection controller which is provided in the docking station activates two solenoids 322, 324 or functionally equivalent motors 138, 142 to first lock the PPM in place in the docking station, and then connect the electrical connector of the PPM2 to the connector internal to the docking station. Once these connections have been established, then the connection controller causes power to be supplied (FIG. 24, 208) from the docking station main power supply to the PPM 2. The elements which are internal to the PPM in this figure are outlined in the dotted lines.

Three manual function control switches are also provided in the docking station; they might for example simply being implemented through keyboard strokes. The ejection switch SW3, 326 can be depressed at any time to order ejection of the PPM. The manual reset SW4, 328 and power on SW5, 330 are also manual switches which must be provided to control the state of the PPM; their states are checked periodically by the software of FIG. 26.

Switches 326, 328 are coupled through flip flops which also respond to the connection controller; their states are conveyed to a state register 332 in the PPM. A further signal, the power off request, is provided from the connection control to the PPM through a gate 334 as a non-maskable interrupt which receives priority over all other interrupts and commands being executed by the PPM. A power off permission flag F5, 336, is also provided for reasons which become apparent in conjunction with the analysis of the connection control software. A power on reset flip flop F4, 338 is also provided as is standard in the implementation of computers.

Figures 27, 28, 29:
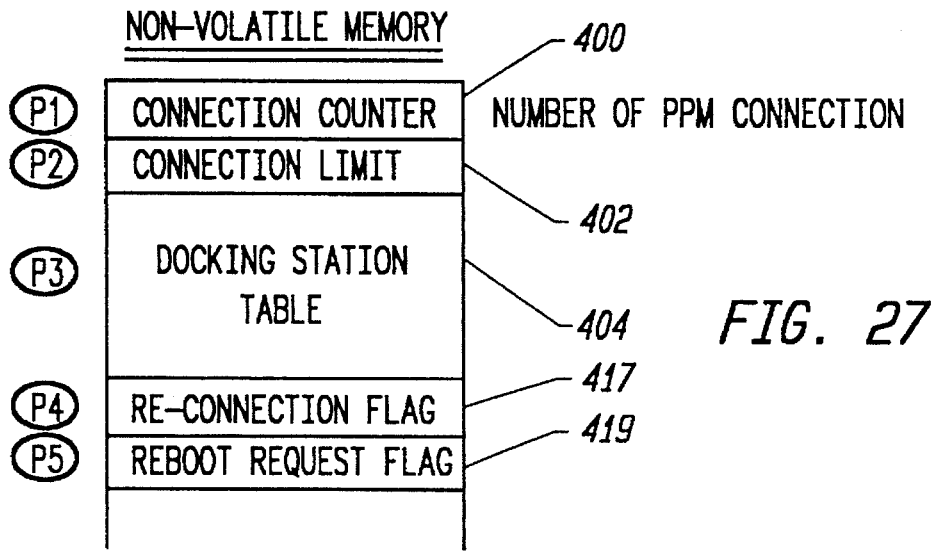
FIGS. 27–29 illustrate the flags and registers and essential information stored in the personal processing module.

Referring next to FIG. 27, the sequence of steps the software must follow for connection and disconnection of the PPM is reviewed. As shown beginning at the top of the flow chart, first the insertion of the PPM is detected, step 340, the PPM is locked, step 342, and connected, step 344. The main power supply is now turned on, 346 and the main power switch is checked 348. If it is off, then a check is made to see if a power off request, setting flag F2, has been sent to the PPM 350, and the state of the power off permission flag is checked 352. The state of the main power switch must now again be checked 354 and if this switch is on, then a return to step 346 is executed. If the main power switch is not off, step 348, then the sequence can jump ahead to check for ejection request 356. Once this loop 354 is entered, as long as the main power switch remains on, and there is no eject request, the software will periodically check to be sure that the state of these switches has not changed, and the docking station and PPM will operate to execute the software as desired by the user.

When the main power switch is found to be off, step 54, then a check for an eject request is made, 358, and with the main power on, 360, a power off request 362 is sent. When the power off permission flag is on, 362, the main power is turned off, 364, the PPM is disconnected, 366, and the PPM is unlocked, 368. In this way, a straightforward control loop is set up to monitor the power on and off switches, and eject requests that may be generated by a user.

FIGS. 28, 29, 30 and 31 show flags and registers which have been defined in the docking station and PPM. Certain registers in the docking station and PPM are used to implement the connection counter so that a count can be maintained on the number of times a connection is made by each PPM and by each docking station. The registers and associated memory store configuration information so that when a PPM is connected to a docking station, the PPM can be set up to meet the needs of the user now using the docking station; or, once a set up sequence has been executed, the same sequence can be re-executed every time a PPM is connected to the same docking station. In this way, the user and holder of a PPM only needs to execute the set up sequence once for each docking station he wishes to use.

FIGS. 28–31 show the information stored in various flag registers in the PPM and in the docking station; in instances where the registers in the non-volatile memory serve as pointers, these figures explain what files are referred to. The non-volatile memory in the PPM is, for example, a flash memory which is a memory that can be updated but in which data is not lost when the power is removed.

Register P1, 400 is a connection counter which stores the number of times a PPM is connected to all docking stations. Register P2, 402 stores the limit for the connector which is a part of the PPM. Register set P3 is a docking station table which is shown in greater detail in FIG. 29. When the PPM is connected to a docking station, as will be discussed in greater detail below, an ID number of the docking station is read as well as a configuration revision number for that docking station. These two parameters are stored at registers D1 and D2 in non-volatile memory in the docking station, as shown in FIG. 31. These parameters define access to two of the basic subroutines which must be set up under MS-DOS for every docking station to which connection is to be made. They are shown as config.N1 and autoexec.N1 for a configured config.sys and a configured autoexec.bat, pointers, 410, 412 are pointers to files on the hard disc drive in the PPM where the config.sys and autoexec.bat routines, as well as associated application software are stored. In other words, the disc drive stores at files 414, 416 a unique set of subroutines and applications which have been assigned to each docking station and each revision of each docking station; each file is identified by pointers 406–412 in docking station table 404.

The hard disc drive also stores at file P7, 418 a default config.sys and autoexec.bat to be used to set up the relationship between PPM and docking station every time the PPM is used with a new docking station. Finally, the PPM memory stores flags P4, 417 and P5, 419 which are checked during execution of the connection routine.

In the docking station, there is also a region of non-volatile memory which stores at location D1, 430, the unique ID number for that docking station. At location D2, 432, the configuration revision of the docking station is stored. At D3, 433, several parameters are stored relating to, for example, EISA I/O and PCI I/O which will be called upon by the bootstrap routine and must be maintained permanently in the docking station. At location D4, connection counter 436 counts the number of times the physical connector in the docking station has been used; at register 438, location D5, the limit to the number of connections for the physical connector is stored.

Figure 32:
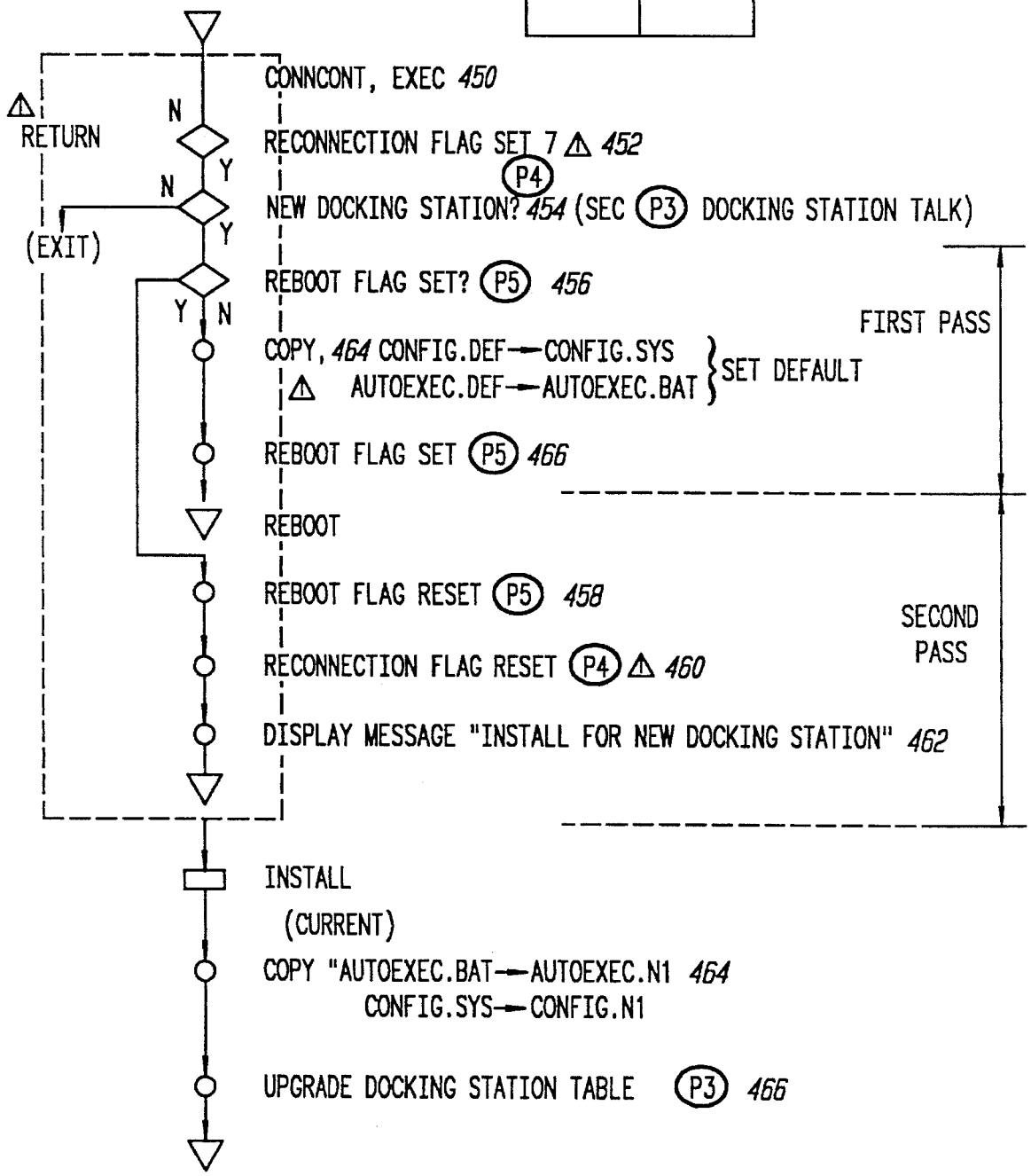
FIG. 32 is a flowchart of the sequence of steps followed in connecting the personal processing module to another docking Station to which the personal processing module was not previously connected.
Figure 33:
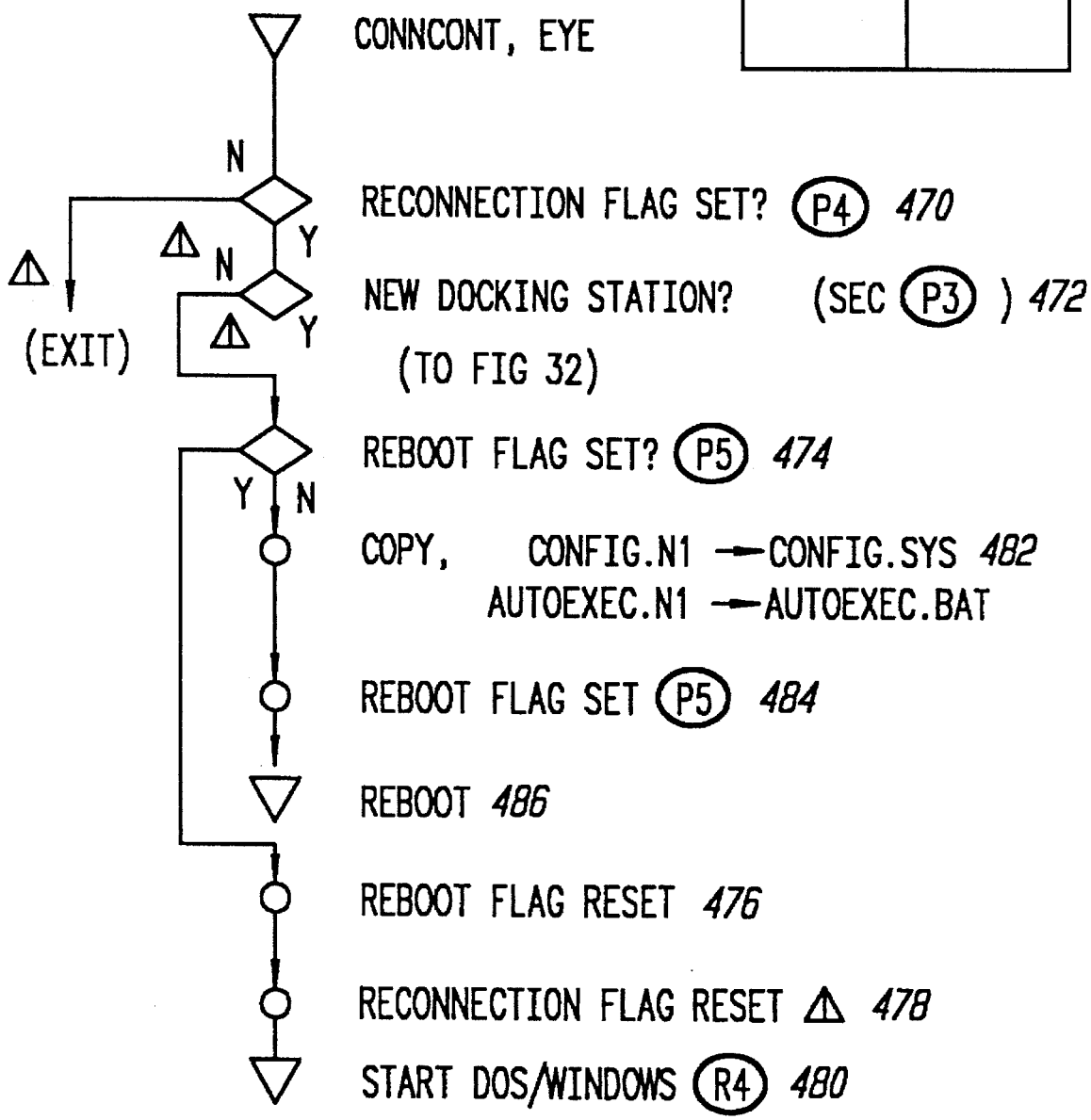
FIG. 33 is a flowchart of the sequence of steps followed in establishing a connection between the personal processing module and an old docking station.

Referring next to FIG. 32, the sequence disclosed herein is utilized for the first docking station that the PPM is used to install the operating system on the PPM. When the PPM has been physically connected to the docking station, DOS, which includes a default config.sys on the floppy on which it is received, is installed 440 on the hard disc on the PPM. Next is loaded 442, the default autoexec.bat which will include "CONNCONT.EXE" i.e., the routine which is the first to be executed every time the PPM is installed in a docking station. The connection control software will be explained in detail below with reference to FIG. 34. Next is installed WINDOWS 444, and any desired applications 446. All these steps can be done after the PPM is connected to a docking station, as the PPM has no input/output devices. The docking station table stores, at location P3 (FIG. 27), the ID number and revision number 406, 408 of this docking station (FIG. 28); the files for the config.sys, autoexec.bat, WINDOWS and other applications are stored at P6 (FIG. 29). The config.sys and autoexec.bat are also stored as the default routines at file P7, 418. This completes the sequence which initializes the PPM, FIG. 31, which now has a loaded operating system and the applications desired by the user, as well as default set-up routines. Of course, a PPM could be sold to a user already loaded with an operating system and application software.

Figure 34:
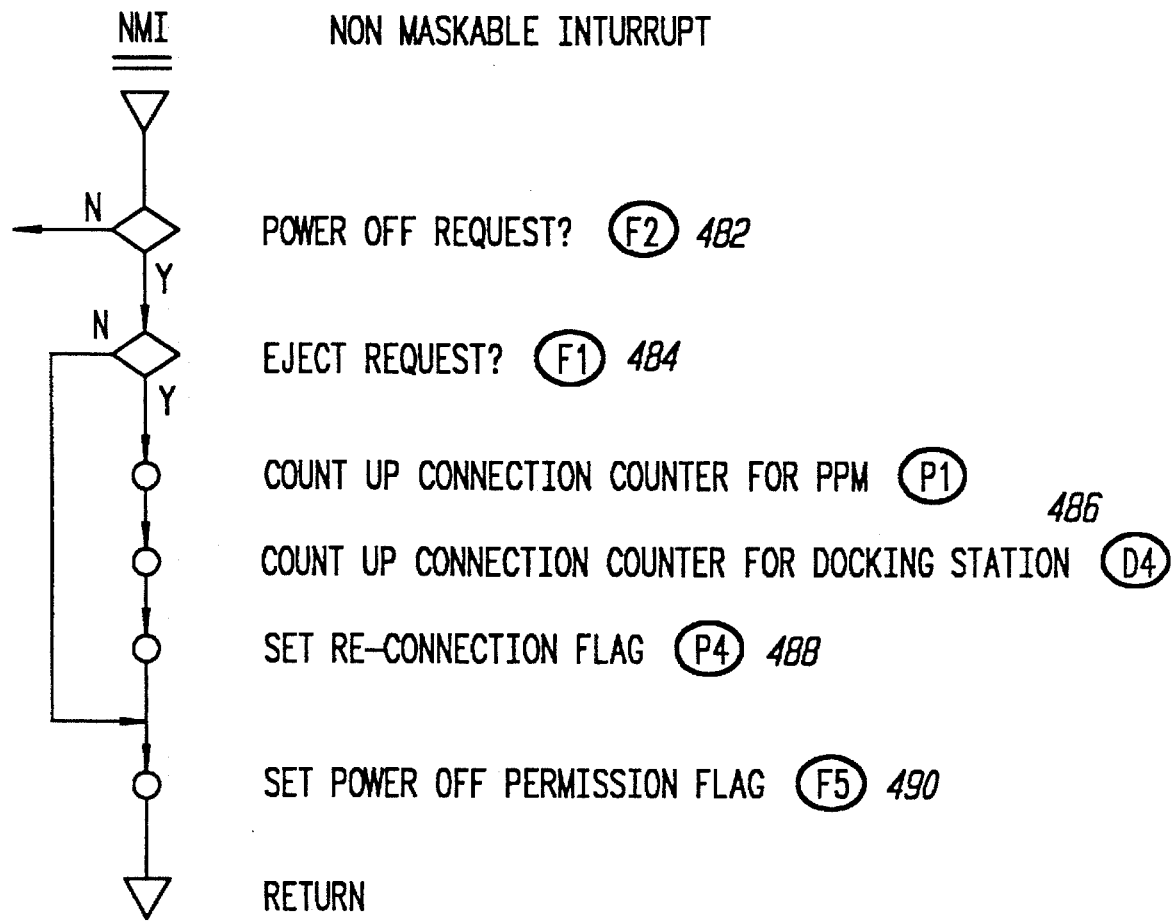
FIG. 34 illustrates a sequence of steps followed by the processor in checking for the set up of a non-maskable interrupt.
Figure 35:
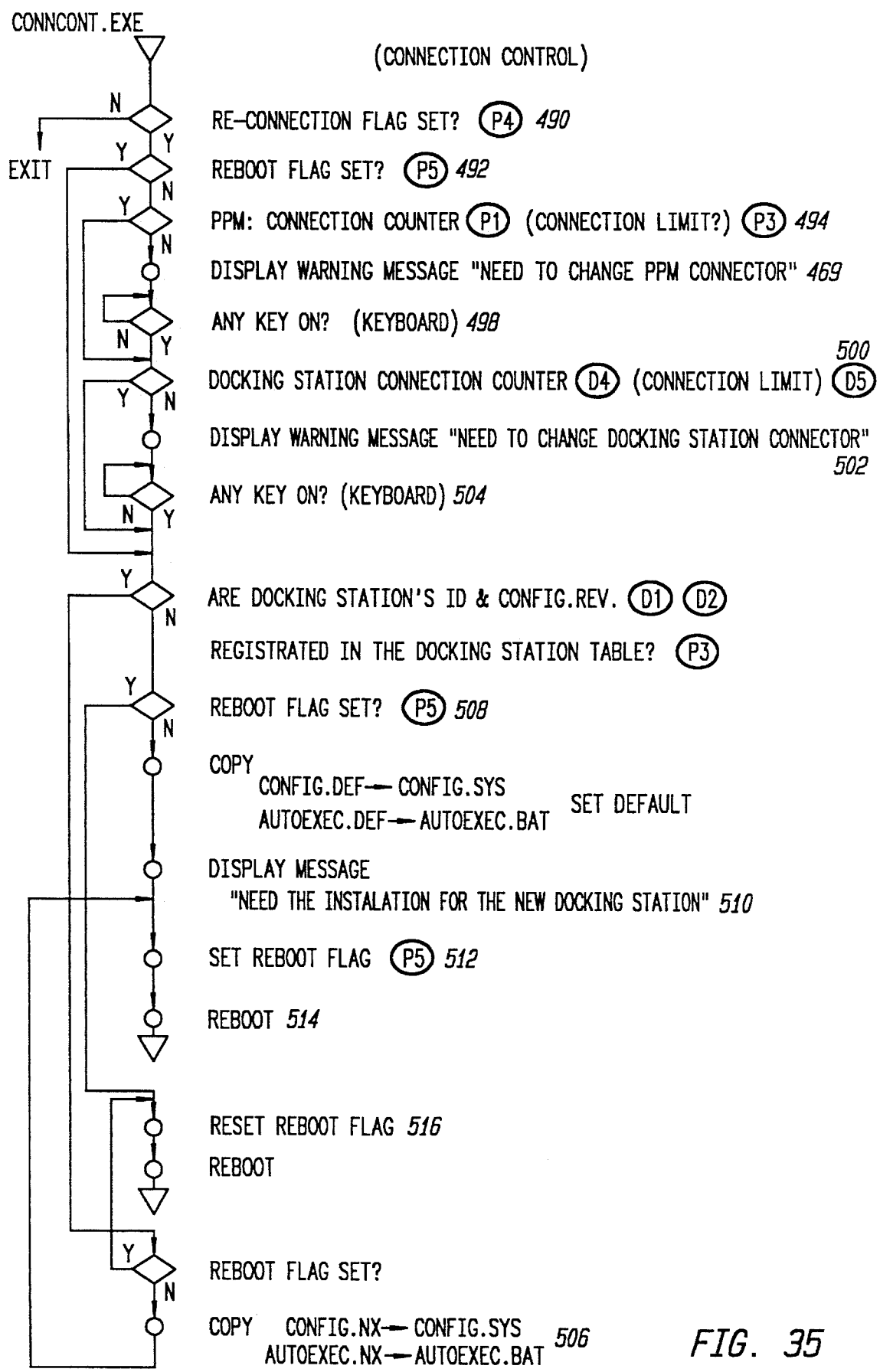
FIG. 35 is a flowchart of a sequence of steps followed by the controller in the beginning of each connection control.

Once the initial connection between a new PPM and a first docking station has been carried out, and the software set up, in the future either the sequence of FIG. 32, connection to another new docking station, or the sequence of FIG. 34, connection to an old or previously connected docking station for that PPM will be executed at the time each connection is made. Reviewing first FIG. 32, upon connection of the now initialized PPM to another new docking station, the CONNCONT.EXEC 450 is executed. (This will be reviewed below with reference to FIG. 34). This routine of FIG. 32 begins by checking 452 the reconnection flag location P4 in the PPM memory. If it is not set, this causes exit from this routine. If the flag is set, the routine looks 454 at location P3 in the PPM's docking station table to see if this is a new docking station for this PPM. If it is NO, then the sequence moves to that of FIG. 34.

If YES, the routine checks 456 the reboot flag P5.

If the reboot flag is not set then default config.sys and default autoexec.bat are copied from default area P7, 464 and the reboot flag is set 466. The reboot flag is now set; the routine resets the flag 458, resets the reconnection flag 460, and displays a message stating that the installation routine for a new docking station is being executed 462. After step 462, creating the install message, the system now copies the autoexec.bat and config.sys and associate them with this docking station in table P3 as step 464 so that they are now stored in the appropriate files P6 (FIG. 30) on this PPM. This upgrading of the docking station files is followed by an upgrade 466 of the docking station table P3 which completes the sequence for connection to the new docking station. The docking station and PPM are now ready to operate. Every future connection between this PPM and docking station will begin with execution of the sequence of FIG. 34.

The sequence of operations for a situation of connecting PPM to a known docking station, wherein the docking station table contains an ID number and revision number (FIG. 29) which identify the docking station, will now be reviewed with respect to FIG. 34. The connection sequence begins with a check 470 of the reconnection flag P4, and an inquiry 472 whether this is a new docking station. If it is a new docking station, the sequence diverts to FIG. 32. If it is not a new docking station, a check 474 of the reboot flag P5 is conducted. If the reboot flag is set, then the flag is reset 476, the reconnection flag is reset 478 and DOS and WINDOWS begin execution 480 using the pointers P4 related to the ID of the docking station. If the reboot flag is not set 474, then config. N1 and autoexec.N1 which are associated with the ID number and with the revision number of the already identified docking station are executed 482. The reboot flag is set 484, and rebooting 486 using the bootstrap ROM is now carried out.

Figure 26:
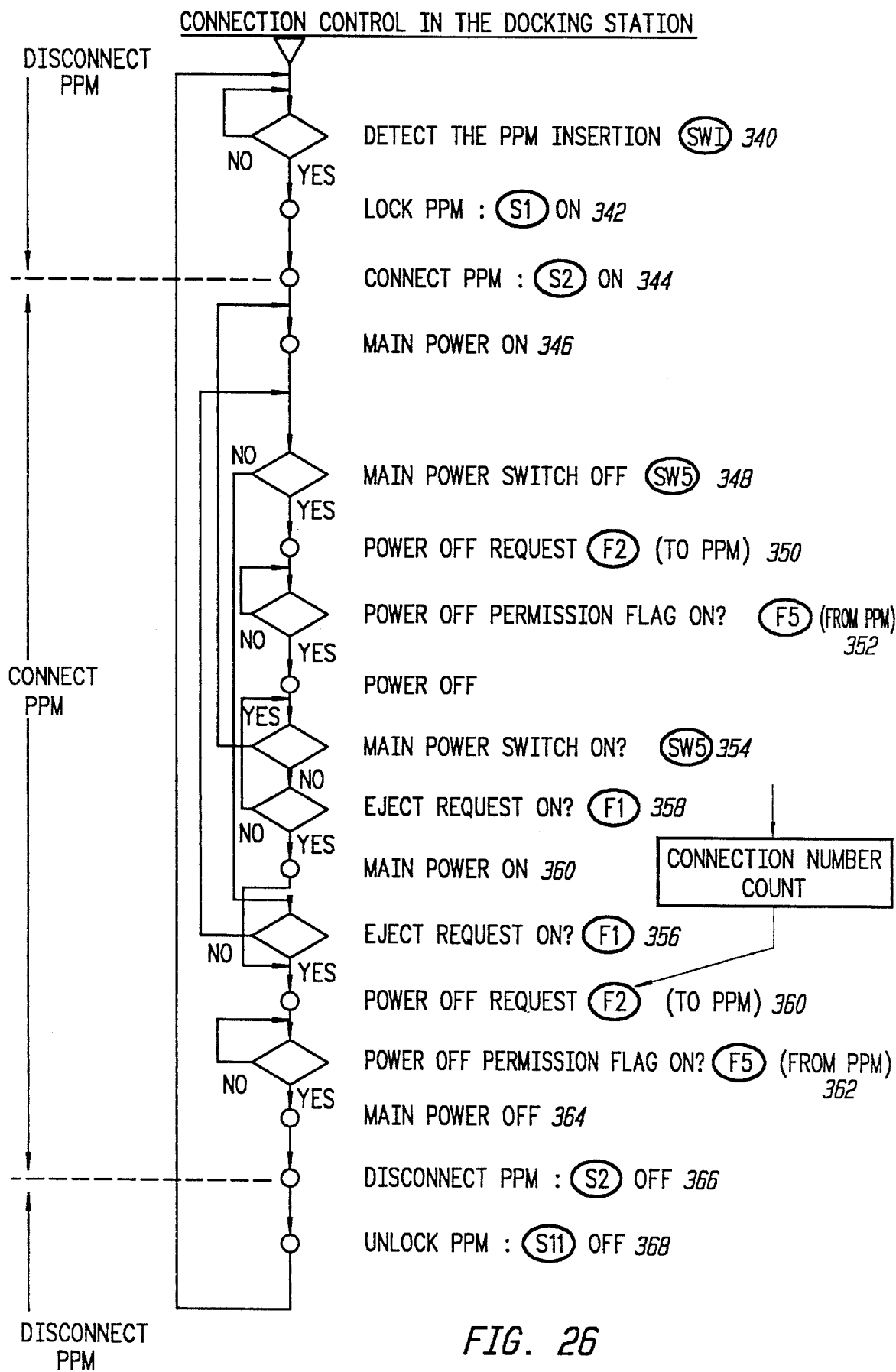
FIG. 26 is a flow chart of the connection control sequence executed within the docking station.

FIG. 34 is the sequence for checking the non-maskable interrupt referred to at FIG. 26 where the basic connections between the docking station and PPM are reviewed. The non-maskable interrupt sequence of FIG. 34 exists so that the system will periodically check for ejection and power off requests and respond quickly to allow disconnection of a PPM from a docking station. In this sequence the system is periodically checking 482 for power off requests by monitoring the status of flag F2, and checking 484 for ejection requests by monitoring the status of flag F1 also shown in FIG. 26. When a power off request and ejection request are received, the connection counters P1 for the PPM and D4 for the docking station are counted up 486 to the next value. The reconnection flag P4 is reset, 488, the power off permission flag F5 is set 490 and disconnection is now permissible. The check of the reboot flag at step 474 allows the system to begin operations immediately of the PPM has not been executed from the docking station and reinserted, but rather was merely turned off. This sequence enables the system to maintain an accurate count of how many times each connector has been used, so that the connector can be replaced before failing.

FIG. 34 is the connection control CONNCONT.EXEC, a start-up sequence which must be executed each time a PPM is connected to a docking station. This sequence cycles the PPM and docking station through a number of checks of the status of flags and counters which are important for monitoring the functions of both docking station and PPM. The sequence beings with checking whether the reconnection flag is set 490 and whether the reboot is set 492; if the reboot flag is set then this next sequence of checking the usage of the connectors has already been executed. That is, this sequence needs to be executed only when a PPM is again reconnected to a docking station, and is not executed if the docking station was already connected to this PPM and the PPM is just being restarted.

If the reboot flag is not set preceding rebooting, the connection counter for the PPM is compared 494 to the connection limit and if exceeded, a warning message is displayed 496. After acknowledgement 498, the same sequence is executed for the connector for the docking station at 500, 502, and acknowledged 504. The docking station ID and config rev, that represents the status of the latest revision related to the configuration of the docking station are checked and if registered in the table P3 then the appropriate config.sys and autoexec.bat are copied 506 and the application software may be executed. If not, then the reboot flag must be set 508, and the default config.sys and autoexec.bat are copied and the "program for installing a new docking station" is called 510. The reboot flag is set, and rebooting occurs. Alternatively, if after checking the docking station ID 506, the reboot flag was already found to be set at 508, then the reboot flag is reset 516 and rebooting occurs 518. In either event operation of the system is now initiated.

The above description of the software sequences in the present invention is only intended to be exemplary of one mode of implementing the present invention. Many other sequences could be implemented to check the status of the registers, maintain the identification of the PPM and the docking station, and check the lifetime of the connectors, and properly boot up the PPM and docking station after each connection so that the user of the PPM is always presented with a visual configuration which he is familiar with and application software that he desires to use.

Therefore the scope of the present invention is limited only by the following claims.

What is claimed is:

1. A personal processor module (PPM) for use with any one of a plurality of docking stations, each said docking station providing necessary computer system components not provided by said PPM so that said PPM and said docking station when coupled together form an operational computer system, said PPM being operable solely when coupled with said docking stations, said necessary computer system components comprising a power supply, a keyboard and/or other input device, a display and/or other output device, said power supply supplying power to said personal processing module, a fan to generate an air stream for cooling said PPM when said docking station and said PPM are coupled together and a docking station connector for electrically connecting said docking station to said module, the personal processing module comprising a processor and related logic including main memory and/or cache memory, a mass storage device connected to and providing data storage for said processor and said logic, and a personal module connector for electrically connecting said personal module to said docking station by means of said docking station connector, said personal processor module and mass storage device thereby being driven by said power supply of said docking module and exchanging data with said docking module via said docking connector.

2. The personal module of claim 1 wherein each of said docking units include means driven by said power supply for locking said personal module into said docking station when said module is inserted in said docking station, said locking means responsive to a control sequence initiated by a user of said personal module to unlock and release said module to be removed from said docking station, whereby said module may not be inadvertently withdrawn from said docking station and thereby decoupled from said power supply.

3. A personal module as claimed in claim 1 including means for monitoring the number of times the connector in said module is physically connected and disconnected to one of said connectors in said docking station, means for storing the maximum count for said module connections which is the expected lifetime of said connector, means for comparing said stored expected lifetime and said count of module connections, and means for indicating a message when said count of actual connections exceeds said stored expected lifetime.

4. A personal module as claimed in claim 1 wherein said module has physical dimensions comprising a length no larger than 230 mm., a width no larger than 130 mm., and a height no larger than 23 mm.

5. A personal module as claimed in claim 1 wherein the module has physical dimensions comprising a length no larger than 145 mm., a width no larger than 120 mm., and a height no larger than 39 mm.

6. A personal processor module as claimed in claim 1 wherein said module comprises a housing having a top, sides, and a base, and including said mass storage device comprising a hard disc drive mounted adjacent the side and a base of said housing and electrically connected to a main board supported within said housing for mounting said processor, air flow windows being provided in said housing such that said windows and said base define an air flow path from one of said windows past said processor to the other of said windows, said housing further including shutters over said air flow windows which are normally closed when said PPM is not inserted in said docking station and normally open when said PPM is inserted in said docking station; such that, when said PPM is coupled with said docking station, said air stream generated by said fan in said docking station enters said housing via one of said windows and flows along said air flow path, said air stream thereby cooling heat generating components of said PPM, including said processor.

7. The personal processor module of claim 2 wherein each of said docking units further includes means driven by said power supply and responsive to means for locking said personal module into said docking station for drawing said connector on said docking station into physical connection with said connector on said personal processor or module, whereby positive electrical contact between said docking station and said module is established.

8. A personal processor module as claimed in claim 7 including means responsive to the locking means and connecting means in said docking station to cause said power supply to supply power from said docking station to said PPM, whereby the PPM may be activated for use by the user.

9. A personal processor module as claimed in claim 8 including means in said personal processor module responsive to said main power supply in said docking station being activated to initiate a connection control sequence to install the PPM in the docking station, said PPM including means for storing an operating system and application software which are responsive to said installation means to be set up for use by the user in combination with the docking station to which the PPM is now connected.

10. A docking station as claimed in claim 1 wherein each said docking station includes memory means to provide identification information for the PPM to identify whether said PPM contains information to make a configuration for said docking station, and wherein said PPM includes memory means for storing information to configure for said docking stations to which said PPM has been connected and for which the PPM has executed a configuration sequence, and means in said PPM for reading said identification information from said docking station and judge whether said PPM contains information to make a configuration for said docking station and causing operation to configure for said docking station based on the results of the judgment.

11. A docking station as claimed in claim 10 wherein said identification information comprises identification number for said docking station and revision number of the configuration for said docking station.

12. A personal processing module as claimed in claim 10 including connection control software comprising said check means for determining whether the PPM has previously been connected to said docking station, said check means causing operation of one of means for storing boot routines in memory of said ppm, or means for executing previously stored boot routines from memory in said PPM followed by starting execution of operating system software and application software previously stored in said PPM.

13. A personal processing module PPM as claimed in claim 7 including means for determining that said PPM is newly inserted in said docking station, said means for locking and means for connecting being responsive to said determining means detecting said new insertion.

14. A personal processing module as claimed in claim 13 wherein said PPM includes manually operable ejection switch means for signalling an ejection request for said PPM by said user, said connection control means responding to said ejection request signal to disconnect and unlock said PPM from said docking station.

15. A personal processing module as claimed in claim 14 further including a connection count register in each of said docking stations and in said PPM, and wherein said connection control means further includes means responsive to said ejection request to update a count of connections stored in each of said connection count registers.

16. A personal processing module as claimed in claim 15 including means responsive to operation of said connection and locking means after insertion of said PPM for supplying power from said main power supply in said docking station to said PPM, and means responsive to said ejection request for terminating power supply from said docking station to said PPM prior to operation of said connection and said locking means to disconnect said PPM from said docking station.

17. A personal processing module as claimed in claim 12 wherein said memory means in said PPM for storing identifications of previously connected docking stations include a docking station table having regions for storing pointers for operating system boot routines and applications stored in said mass memory in said PPM and associated with each previously connected docking station, said connection control software including means for automatically calling said boot routines and applications upon identification of one of said docking stations.

18. A personal processing module as claimed in claim 17 further including default boot routines for an operating system stored in said mass memory, said connection control software including means for accessing said default boot routines upon determining that the docking station connected to said PPM is not listed in said registers in said PPM.

19. A personal processing module as claimed in claim 18 wherein said connection controller includes means for associating said default routines with said identification code for said docking station and storing said association in said docking station table.

* * * * *